United States Patent [19]

Phillips et al.

[11] 3,786,415

[45] Jan. 15, 1974

[54] DATA TERMINALS

[75] Inventors: Brian Harry Phillips, Crick; Robert Gary Young, Kenilworth, both of England

[73] Assignee: The General Electric Company, London, England

[22] Filed: Nov. 14, 1972

[21] Appl. No.: 306,314

[30] Foreign Application Priority Data

Nov. 17, 1973 Great Britain .................... 53380/71

[52] U.S. Cl. ...................... 340/146.1 D, 178/69.5 R

[51] Int. Cl. .............................................. H04l 7/00

[58] Field of Search .................. 178/69.5 R, 69.5 G; 340/146.1 D

[56] References Cited

UNITED STATES PATENTS

| | | | |
|---|---|---|---|
| 3,576,947 | 5/1971 | Kruger | 340/146.1 D X |
| 3,652,799 | 3/1972 | Thomas | 178/69.5 R X |

*Primary Examiner*—Malcolm A. Morrison
*Assistant Examiner*—R. Stephen Dildine, Jr.
*Attorney*—Morris Kirschstein et al.

[57] ABSTRACT

A data terminal for a digital signalling system is arranged to receive incoming data transmitted in serial form and to divide the data into multi-digit signal units for supplying to a processor. Receipt of the data is controlled by a timing generator having a cycle of time slots equal to the number of digits in a signal unit. The validity of each signal unit is checked, using check bits forming part of each unit, and a check fail indication is passed to the processor if an invalid unit is detected. If the processor receives a succession of check fail indications, it initiates resynchronisation of the terminal, by resetting the timing generator. For this purpose, the terminal has a pattern recognition circuit for extracting an indication of synchronisation from the incoming data.

12 Claims, 19 Drawing Figures

DATA TERMINALS

This invention relates to data terminals.

The invention is particularly concerned with a data terminal for use in a digital signalling system, adapted to receive incoming digital data, in serial form, and to divide the data into signal units of predetermined length for supplying to utilisation means (for example, for supply to digital data processing equipment). One difficulty that arises with such a terminal is that of ensuring that the operation of the terminal is synchronised with the incoming data so that the data is divided into correct signal units.

Accordingly, one object of the invention is to provide a novel form of data terminal for use in a digital signalling system having means for resynchronising the terminal with incoming data.

According to the invention, a data terminal for a digital signalling system employing multi-digit signal units transmitted in serial form has receiver circuitry comprising: a timing generator having a cycle of time slots equal to the number of digits in a signal unit; means responsive to said timing generator for dividing incoming serial data into said signal units for supplying to utilisation means; synchronisation indicating means for deriving an indication of synchronisation from said incoming data; and resynchronisation means responsive to a command signal from said utilisation means to reset said timing generator in synchronism with the incoming data in response to a said indication of synchronisation.

Said resynchronisation means may be operative to halt said timing generator in response to a said command signal, and then to restart said timing generator at a predetermined point of its cycle upon occurrence of a said indication of synchronisation. Alternatively, said resynchronisation means may be operative to reset the timing generator, without halting it, to a predetermined point of its cycle upon occurrence of the next said indication of synchronisation following a said command signal.

In a preferred arrangement in accordance with the invention, said resynchronisation means is also arranged to produce an indication, for read out by said utilisation means, of the amount by which the timing generator is out of synchronism with the incoming data.

The invention may be used in a data signalling system wherein each of said multi-digit signal units comprises a message portion and a check portion having a predetermined correlation with the message portion at least on transmission thereof, in which case said receiver circuitry may further comprise checking means for checking the correlation between the check portion and the message portion of each signal unit, and for storing an indication of the absence of such a correlation, for read out by said utilisation means. This indication may then be used by the utilisation means to determine whether the terminal is correctly synchronised, so as to determine whether a said command signal should be issued.

Said indication of synchronisation may be produced upon recognition of a predetermined pattern of digits occurring in some signal units of the incoming data. Preferably, however, the indication of synchronisation may be produced upon recognition of successive sequences of digits in the incoming data having said predetermined correlation as between a message portion and a check portion. In this latter case, the indication of synchronisation is conveniently derived from said checking means.

Preferably, the receiver circuitry is so arranged that, in the event of said checking means indicating the absence of said predetermined correlation during the cycle immediately following a reset of said timing generator, said resynchronisation means automatically resets the timing generator again. This provides a safeguard against the possibility of the timing generator being restarted in response to a false indication of synchronisation.

Said means for dividing the incoming serial data into signals units may comprise a transfer register, a serial-to-parallel converter for receiving said incoming data in serial form and for writing a signal unit into the transfer register, in parallel, at a predetermined point of the cycle of said timing generator, and means for reading the contents of said transfer register into said utilisation means in response to a read instruction from said utilisation means. In this case, the receiver circuitry preferably includes overflow detection means for detecting an overflow condition wherein data is being received by said serial-to-parallel converter faster than it is being read out of said transfer register, and means for inhibiting the writing of a signal unit from said serial-to-parallel converter into said transfer register during occurrence of a said overflow condition. The overflow detection means is preferably also arranged to store an overflow indication for read out by said utilisation means.

The data terminal may also have transmitter circuitry comprising a transfer register, means for writing data from said utilisation means into said transfer register in response to a write instruction from the utilisation means, a parallel-to-serial converter for reading a signal unit in parallel from the transfer register at a predetermined point in the cycle of a transmitter timing generator and for transmitting said signal unit in parallel form. In this case, the transmitter circuitry preferably includes underflow detection means for detecting an underflow condition wherein data is being transmitted from said parallel-to-serial converter faster than it is being written into said transfer register, and means for inhibiting the reading of a signal unit from said transfer register into said parallel-to-serial converter upon occurrence of a said underflow condition. The underflow detection means is preferably also arranged to store an underflow indication for read out by said utilisation means.

Preferably, parity checking means are provided for verifying correct transmission of data between said utilisation means and transmitter circuitry. The transmitter circuitry preferably includes means for injecting a predetermined error in a signal unit to be transmitted, in response to a parity fault detected in the transmitter circuitry. Conveniently, the transmitter circuitry also includes means responsive to an instruction from said utilisation means to cause an incorrect parity bit to be applied to said parity checking means, thereby resulting in injection of said predetermined error. This provides a test for the parity checking means.

Two data terminals in accordance with the invention will now be described by way of example, with reference to the accompanying drawings, of which FIGS. 1–12 relate to a first terminal and FIGS. 13–19 to a second preferred terminal.

The data system employs transmitted data signal units of 28 binary digits in a 'frame' of twelve signal units. In each signal unit the last eight digits are 'error check bits' which have a pattern which is determined in dependence upon the preceding twenty data bits as will be explained further.

Figure 1:
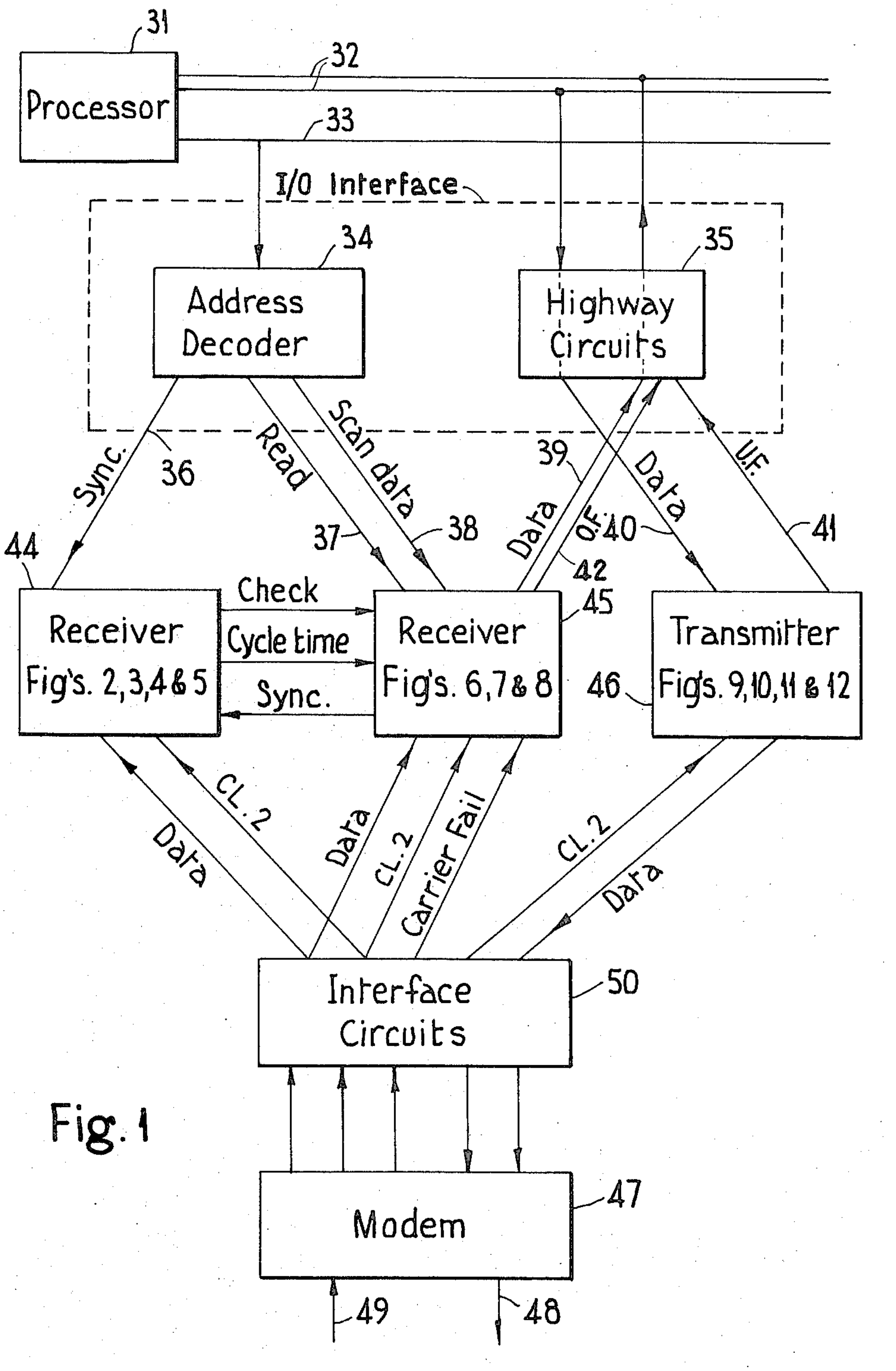
FIG. 1 is a block diagram of the data terminal connected between a digital computer (processor) and a data link.

Referring to FIG. 1, the processor 31 has 18-way input/output highways 32 and an eighteen way address highway 33.

A number of data links are connected to the highways 32, 33 by way of respective data terminals (only one shown). Each data link comprises "go" and "return" lines 48, 49, over which data is transmitted in serial form as phase-modulation of an audio-frequency carrier signal.

Incoming data from return line 49 is demodulated by a modem circuit 47 and is fed, via an interface circuit 50 to a receiver comprising two circuit boards 44 and 45, and thence by way of line 39, highway circuit 35, and data highway 32 to the processor 31. Data from the processor is fed via highway 32, highway circuit 35 and line 40 to a transmitter 46, whence it is fed by way of interface circuit 50 to modem 47, where it is modulated on to the carrier signal and transmitted over line 48. The processor 31 can select any required one of the data links for transfer of data, by means of suitable signals applied to address highway 33, which are detected by an address decoder 34 in the appropriate data terminal.

Receiver board 45 comprises a serial-parallel converter (FIG. 6) which divides the serial train of incoming binary digits intosignal units of 28 bits each for transmission in parallel, to the processor. The timing for this serial-parallel conversion is provided by a timing generator (FIGS. 2, 3) in circuit board 44. The data terminal is periodically addressed by the processor, so as to cause address decoder 34 to apply a "read" instruction to receiver board 45, over line 37, causing a signal unit to be read, in parallel over line 39, highway circuit 35, and highway 32, into the processor.

Receiver board 44 also includes a check register (FIGS. 4, 5) which checks the validity of the received signal units. If an invalid signal unit is detected, a "check fail" indication is stored in an operational data register (FIG. 8) in receiver board 45. The data terminal is periodically addressed by the processor, so as to cause address decoder 34 to apply a "scan data" instruction to receiver board 45, over line 38, causing the contents of the operational data register to be read, in parallel, over line 42, highway circuit 35, and highway 32, into the processor.

Figure 7:
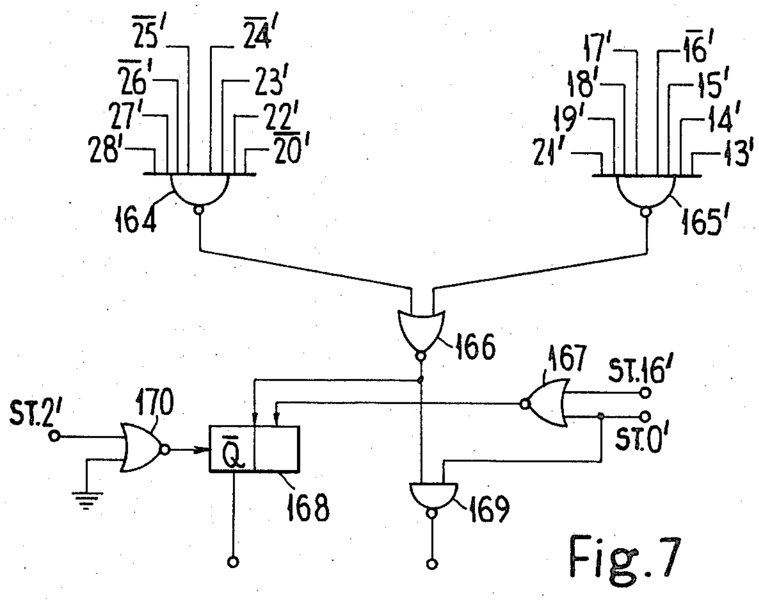

The address decoder 34 also provides, on line 36, a synchronisation control signal having one of two conditions signifying respectively "out-of-sync" and "back-in-sync." Normally, this control signal is in the "back-in-sync" condition. If, however, the processor 31 receives a succession of "check-fail" indications from the receiver, it will take this as indicating that the timing generator in receiver board 44 is out of synchronisation with the incoming data, and therefore will cause the control signal to be changed to its "out-of-sync" condition. This condition activates synchronisation circuitry (FIG. 2) in receiver board 44, which puts the timing generator into a neutral state. The timing generator is restarted, at the appropriate point of its cycle, when a predetermined synchronisation pattern is detected in the incoming data, by means of a synchronisation pattern recognition circuit (FIG. 7). This pattern is a predetermined series of binary digits occupying the first 16 time slots of a signal unit, and occurs in signal units at random intervals as fill-in data, when no intelligence is to be transmitted. When a synchronisation pattern is recognised, the receiver writes an indication of this into the operational data register mentioned above, for scanning by the processor. The processor will then reset the synchronisation control signal to its "back-in-sync" condition, and operation will continue normally.

It should be noted that the synchronisation pattern is not used directly to check synchronisation (this function being provided by the processor in response to a series of "check fail" indications from the receiver), but is used during resynchronisation, in response to an "out-of-sync" condition from the processor.

The operational data register mentioned above is also used to store other data concerning the operational condition of the receiver, including an "overflow" indication, signifying that data is being received more quickly than it is being read out by the processor.

The transmitter 46 basically performs the reverse function to the receiver. Thus, the transmitter contains a parallel-to-serial converter, as well as a check bit generator for generating the above-mentioned error check bits. The transmitter also has a facility for sending an "underflow" indication over line 41 to signify that data is not being provided by the processor sufficiently quickly.

It should be appreciated that the various lines in FIG. 1, although shown diagrammatically as single lines, are in general multiway paths, all transmission of information between circuit boards, highways and processor being in parallel form.

Each data link such as that of FIG. 1 operates asynchronously with each other data link and with the processor.

The receiver circuitry in its first form will now be described in greater detail with reference to FIGS. 2 to 8.

The timing generator 52 (FIG. 2) comprises a five-stage shift-register having stages T1 to T5. The stages are clocked by a 'clock 1' which is derived from the modem circuitry 47 of FIG. 1. This clock signal is picked off the rising edge of the demodulated data bit and regenerated as a square wave signal of frequency equal to the bit rate and pulse duration half the digit time slot. A second clock signal, 'clock 2,' is derived as the inverse of clock 1 and thus has a rising edge midway through the digit time slot. In general, individual bistable circuits are clocked by rising edges while more complex integrated circuits are clocked by falling edges.

The shift register is made to perform a 28 state cycle by means of feedback through gates 53–60. Of these, gates 53–56 and 60 are NAND gates, gates 57 and 58 are AND gates, and gate 59 is a NOR gate. It may be noted that the 'concave input' OR and NOR gate convention is used, AND and NAND gate symbols having straight input faces.

In addition to the 28 states of the normal cycle the timing generator has a zero state not part of the cycle and in which all stages contain a '0.' This zero state is achieved by bistable circuit 61. The upper and lower outputs of this circuit 61 are '0' and '1' respectively in the normal cycle. By virtue of the inverting gate 62 and the lower output, a '1' is thus normally applied to the 'clear' inputs of all five stages of the timing generator. This gives control of the individual states to the clock and steering inputs. The bistable circuit 61 is triggered to its opposite state by a self-steering trigger input from synchronisation circuitry 63 indicating the presence of an out-of-sync condition. On such changeover of the bistable circuit 61 a '0' signal is applied to the overriding clear inputs of the five stages thus setting the timing generator to its zero state.

The "clear" signal can be removed from the timing generator by means of a "0" applied to bistable 61 from terminal 169′, thus allowing the cycle to proceed. As will be explained below, this "0" is derived from gate 169 in the synchronisation pattern recognition circuit (FIG. 7), and is produced when the 16 -bit sync. pattern is detected in the incoming signal. Thus, in the event of an out-of-sync condition, the timing generator is set to its zero state, and is held there until such time as a sync. pattern is detected. When the "clear" signal is removed, the next clock pulse produces a "1" in stage T1, so that the timing generator cycle will re-start at state 10000. Since this state follows the 16-bit synchronisation pattern, it is defined as state 17, which ensures that when the cycle restarts it will be in exact synchronism with the incoming data.

Figure 3:
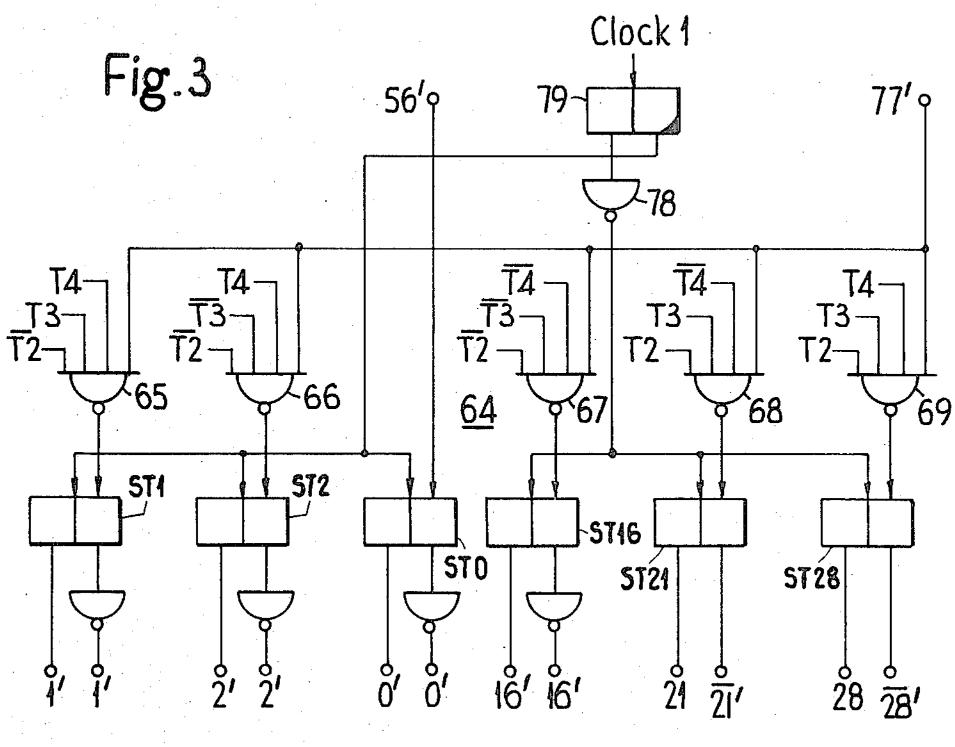

The states of the timing generator cycle which are employed for timing purposes are states 1, 2, 16, 21 and 28. Signals coinciding with these states are provided by decoding circuitry 64 (FIG. 3). This comprises NAND gates 65–69 and bistable circuits ST1, 2, 16, 21 and 28. Signals are supplied to these gates from the normal and inverse outputs of the five stages of the timing generator 52 as indicated. In addition, a NOR gate 77 receiving inputs T5 and T1 provides a signal 77′ common to all five gates 65–69.

The outputs of these five gates are applied as steering inputs to the bistable circuits ST1, 2, 16, 21 and 28. A further bistable circuit STO receives a steering input 56′ from gate 56 (FIG. 2) already employed in the feedback circuitry of the timing generator 52, indicating whether or not the timing generator is in its zero state.

The decoding circuitry is triggered by a delayed clock 1 signal, the delay being effected by a monostable circuit 79. The six bistable circuits ST1–28 are shared between the normal and inverse outputs of the monostable by virtue of an inverting gate 78. The various signals 1′, 2′, 0′, 16′, 21′, $\overline{21}$, 28′ and $\overline{28}$′ are then obtained at the appropriate points in the timing generator cycle, from the bistable circuit outputs.

Figure 5:
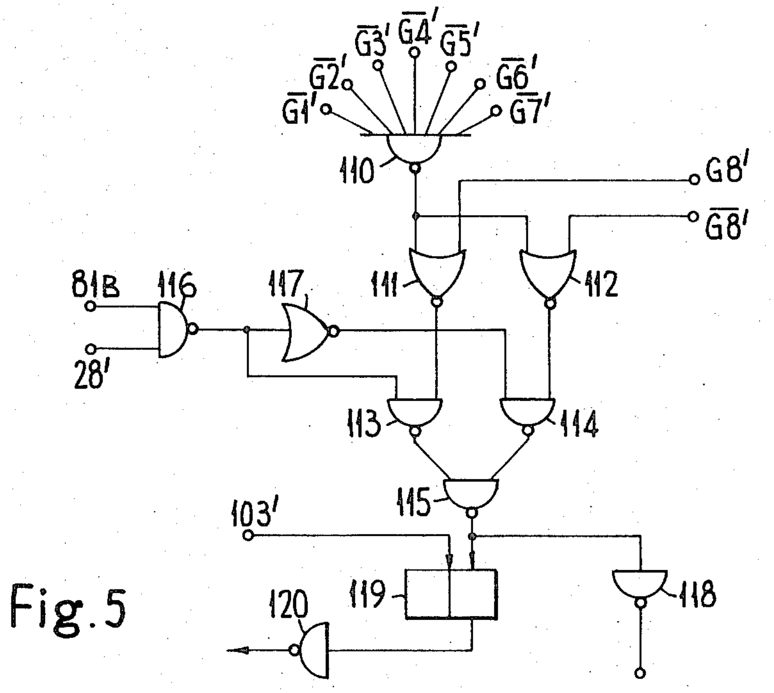
Figure 4:
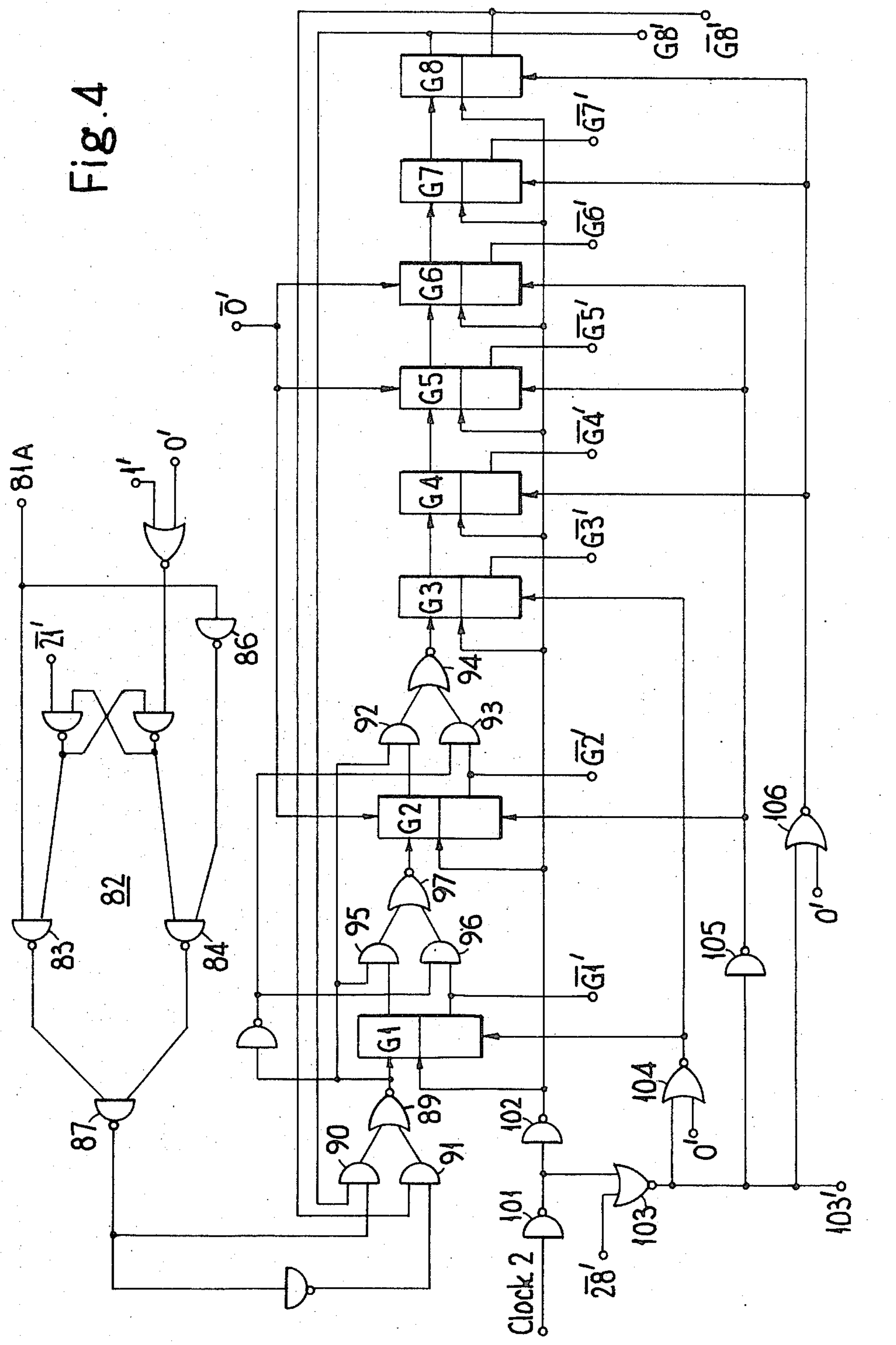

Referring now to FIGS. 4 and 5, these show, respectively, a check register and a pattern checking circuit. The signal units are fed serially to terminals 81A (FIG. 4) and 81B (FIG. 5) in common. A toggle circuit 82 (FIG. 4) enables a gate 83 from the occurrence of state 21 at the same time disabling a gate 84, and from state 1 produces the reverse effect. By means of a NOR gate 85 state 0 will also achieve the latter effect.

Thus gate 83 provides a path for the check bits while gate 84 provides a path for the initial twenty bits of data. A gate 86 does, however cause a further inversion of the data so that at the input to gate 87 the data is normal and the check bits are inverted. This relative inversion takes account of a relative inversion of the check bits at the transmitter.

Gate 87 thus provides serial signal units modified by the relative inversion of data to check bits. These modified signal units are supplied in normal and (totally) inverted form to two AND gates 90 and 91 respectively.

The check register itself comprises eight bistable stages G1–G8 connected as a shift register but having certain 'feedback' and 'feed-forward' connections such that the pattern shifted through the register is influenced by preceding and succeeding digits. The connections in question are by way of gates 89, 90 and 91 to steer G1, 92, 93 and 94 to steer G3, and gates 95, 96 and 97 to steer G2. These interconnections are in accordance with a CCITT system specified by telephone authorities and are similar to those in a check bit generator, to be described with reference to FIG. 11, which generates eight check bits by the passage of the 20 data bits through the generator, the check bits being related to the data bits in accordance with the stage interconnections of the generator. The check register of FIG. 4 has a complementary function to the check bit generator, such that if a signal unit of 28 bits (including eight check bits produced by such a check bit generator) is fed into it, the pattern occupying the check register after the last digit has been clocked in, will be all zeros. A check is thus provided on the validity of the signal units because, of course, if there is an error in one or more digits of the received signal unit, the all zero pattern will not be obtained.

The check register is clocked at clock time 2, that is at the rising edges of clock 2, after two inversions by gates 101 and 102.

After this check has been made, i.e. at the end of state 28, all the stages of the check register are reset, to ensure that the check register contains all zeros before feeding in the next signal unit, as is required for correct operation. This is effected by gates 103–106 of FIG. 4. Gate 103 is a NOR gate having one input fed by signal $\overline{28}$ and another fed by the clock 2 signal via gate 101. Gate 103 therefore has a '1' output only during the second half of time slot 28. This '1' output is inverted to a '0' by gates 104, 105 and 106 for application to each stage if the check register as an overriding 'clear'input, to produce a '0' output from the upper sides of each bistable stage.

Figure 2:
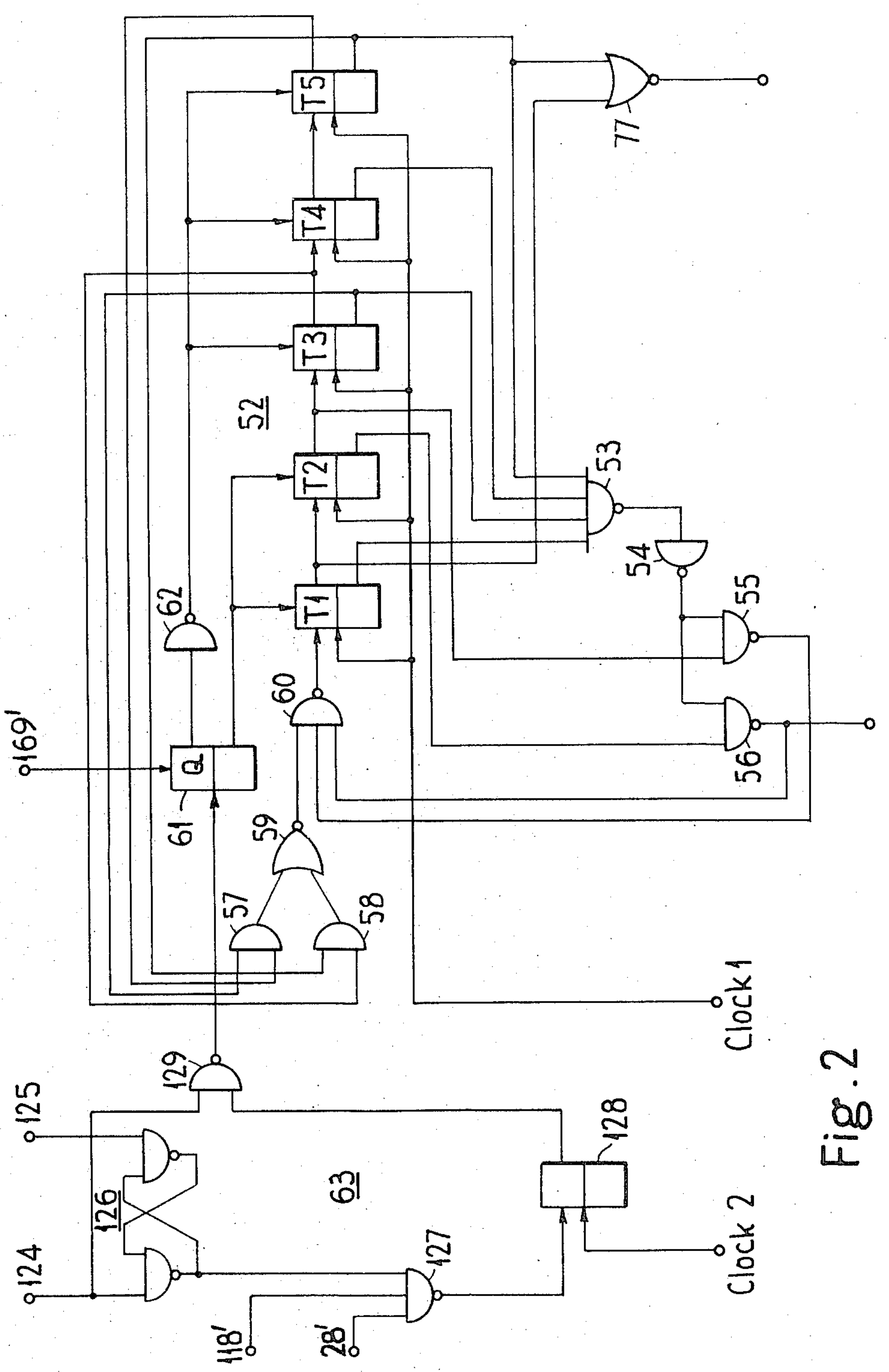
FIGS. 2 to 8 show parts of receiving circuitry of the terminal.

As mentioned above, in the out-of-sync condition the timing generator 52 of FIG. 2 is set to the zero state until such time as a sync pattern is detected, whereupon the timing generator commences re-cycling from state 17. The check register of FIG. 4 should then contain the pattern (in this case, 01001100) it would have contained if the sync. pattern had just been fed into it. To ensure this, while the timing generator is in its zero state, the check register is held in this post-sync-pattern state. To this end, the signal $\overline{0}$′ is applied to stages G2, G5 and G6 to 'preset' these stages to '1' and the signal 0′ is applied to gates 104, 105 and 106 for inversion to 'clear' stages G1, G3, G4, G7 and G8, thus providing the resulting 0 1 0 0 1 1 0 0 pattern, as required.

Referring now to FIG. 5 this shows the circuitry employed to detect the all zero's pattern in the check register, indicating a valid signal unit.

The all zero's pattern in question will appear in the check register immediately following the clock 2 pulse in state 28. If the signal unit is in error this fact would need to be detected, and the information stored for scanning by the processor, all in the time between state 28 time 2 and state 1 time 2. This period is not sufficient for these functions so the circuitry of FIG. 5 is designed to overcome the difficulty.

A seven input NAND gate 110 is supplied with signals $\overline{G1}'$ to $\overline{G7}'$ so that at state 27 time 2 this gate will provide a '0' output from a valid signal unit although the G8 state digit at that time may be '1' or '0'. The output of gate 110 is applied to two NOR gates 111 and 112 to one of which (111) a G8' signal is applied, and to the other (112) a $\overline{G8}'$ signal is applied. The outputs of gates 111 and 112 are applied to NAND gates 113 and 114 respectively. The signal unit is applied to terminal 81B and then to a NAND gate 116 together with a state 28 signal. The inverted twenty-eighth bit so produced is applied to gate 113 and after a further inversion, by gate 117, to gate 114. The outputs of gates 113 and 114 are applied to NAND gate 115.

Gate 115 thus provides an output signal which may be represented as $(\overline{D}_{28} . \overline{G8}) + (D_{28} . G8)$ that is, a '1' when the twenty-eighth bit of the signal unit is the same as the G8 bit. This condition indicates that the pattern to appear in the check register at state 28 time 2 will be the required all zero's pattern and the indication of validity will appear at the beginning of state 28.

The '1' success indication from gate 115 is inverted by gate 118 and applied as a 'check fail' indication to the synchronisation circuitry 63 of FIG. 2. In addition, the output of gate 115 is applied to a bistable circuit 119 for application, after inversion by a gate 120, to the operational data register of FIG. 8. Thus at the occurrence of state 28 time 2 the check is already made and the result ready for putting into effect.

Reverting to FIG. 2, the function of the synchronisation circuitry 63 is as follows. Pulse signals are received from the processor to indicate a change of condition from in-sync to out-of-sync and vice versa. An out-of-sync indication is provided as a '0' pulse to terminal 125. A toggle circuit 126 comprising two cross connected NAND gates is triggered into its two states by the two pulse signals respectively. A NAND gate 127 is enabled by the coincidence of the out-of-sync toggle state, state 28, and a 'check fail' indication from gate 118 in FIG. 5. The resulting '0' output steers a bistable circuit 128 to a '0' state at state 28 time 2. A NAND gate 129 receives a '0' input from terminal 124 on the receiver falling out of sync and also receives a '0' input from bistable 128 on subsequent occurrences of a 'check fail' indication. Both inputs to gate 129 have the effect of triggering bistable circuit 61 to that state in which the stages of the timing generator 52 are cleared to provide the zero state as previously described.

The 127, 128, 129 path to clearing the timing generator 52 is provided to cover the possibility of the bistable 61 being cleared (to restart the generator cycle) by a spurious sync pattern while the receiver is in an out-of-sync condition. In such a case the cycle would restart from state 17 but on reaching state 28 the all zero's check bit pattern would not appear, gate 127 would be enabled and bistable 61 would be reset to the out-of-sync state to re-establish the zero state of the timing generator.

The toggle circuit 126 remains in its out-of-sync condition until the processor receives an indication of genuine synchronisation. Each indication of synchronisation, genuine or spurious, is 'offered' to the operational data register previously mentioned, for scanning by the processor. However, the operational data register does not read the offered information until state 1 (as will be explained) which will not arise with even a series of spurious in-sync- indications because the bistable circuit 61 will be constantly reset to its out-of-sync condition at each state 28. The cycle will restart at state 17 proceed to state 28 and then reset to the zero state.

Figure 6:
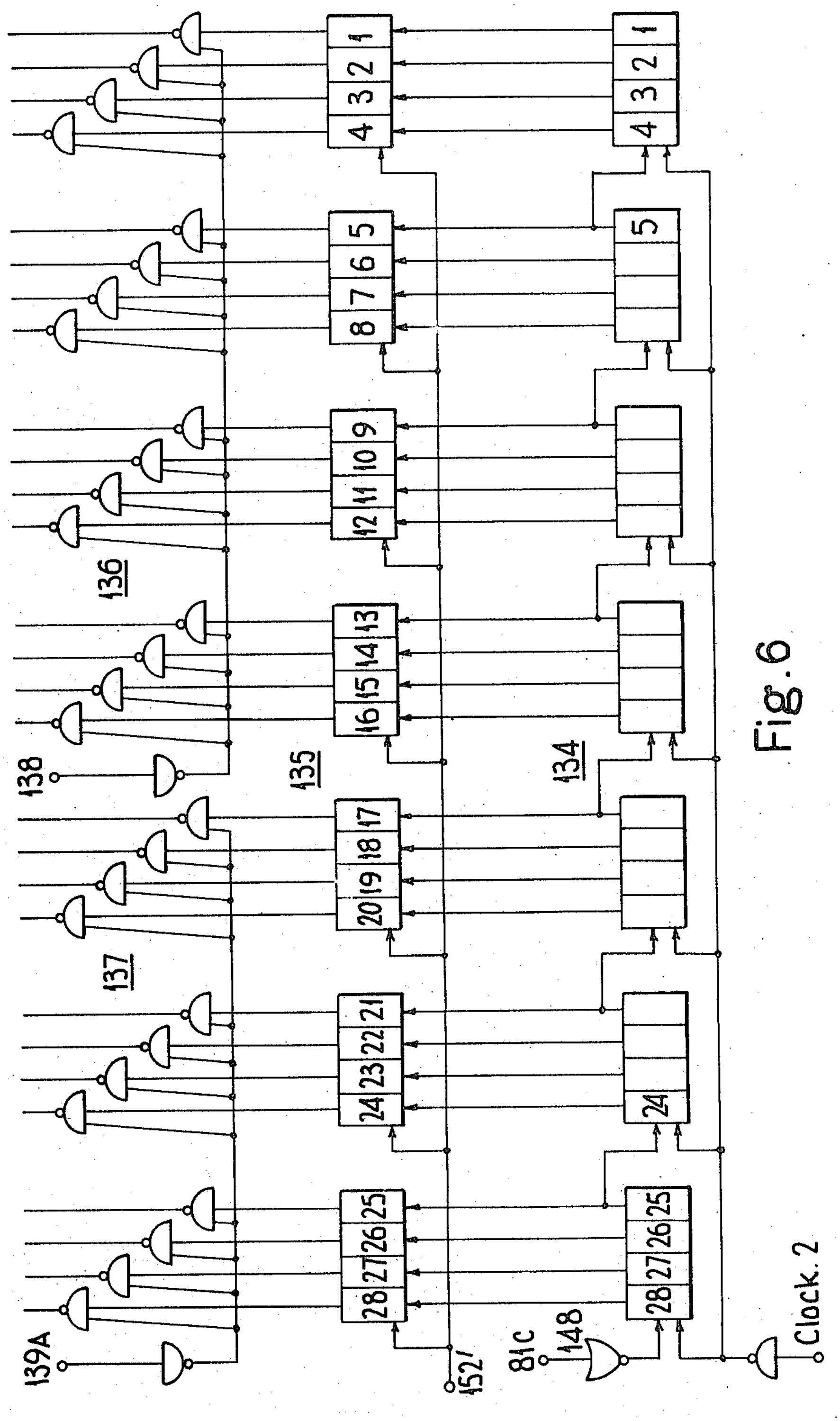
Figure 8:
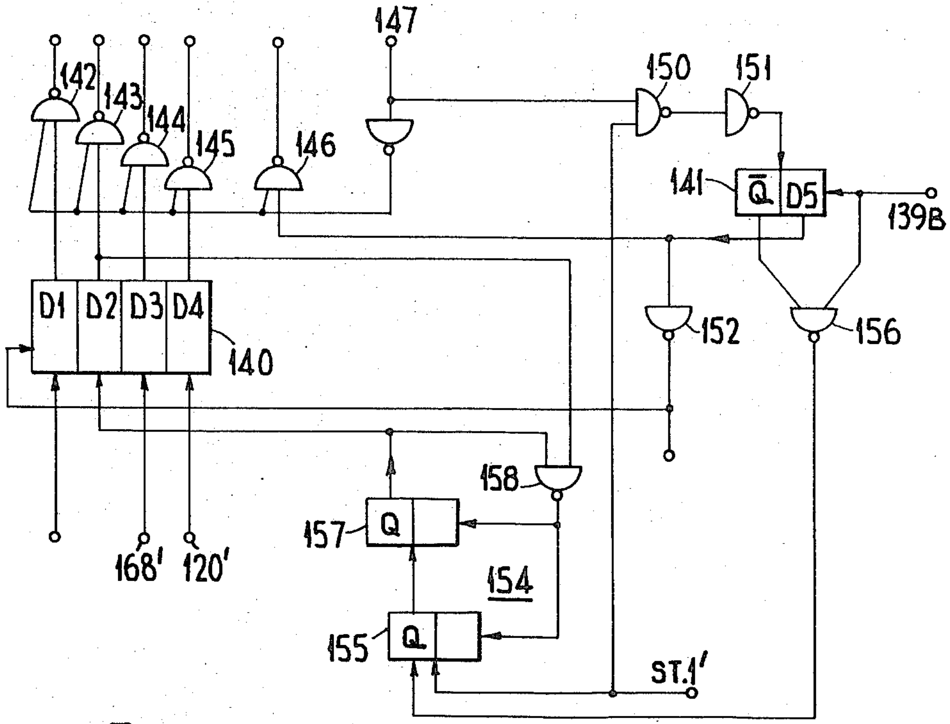
Figure 9:
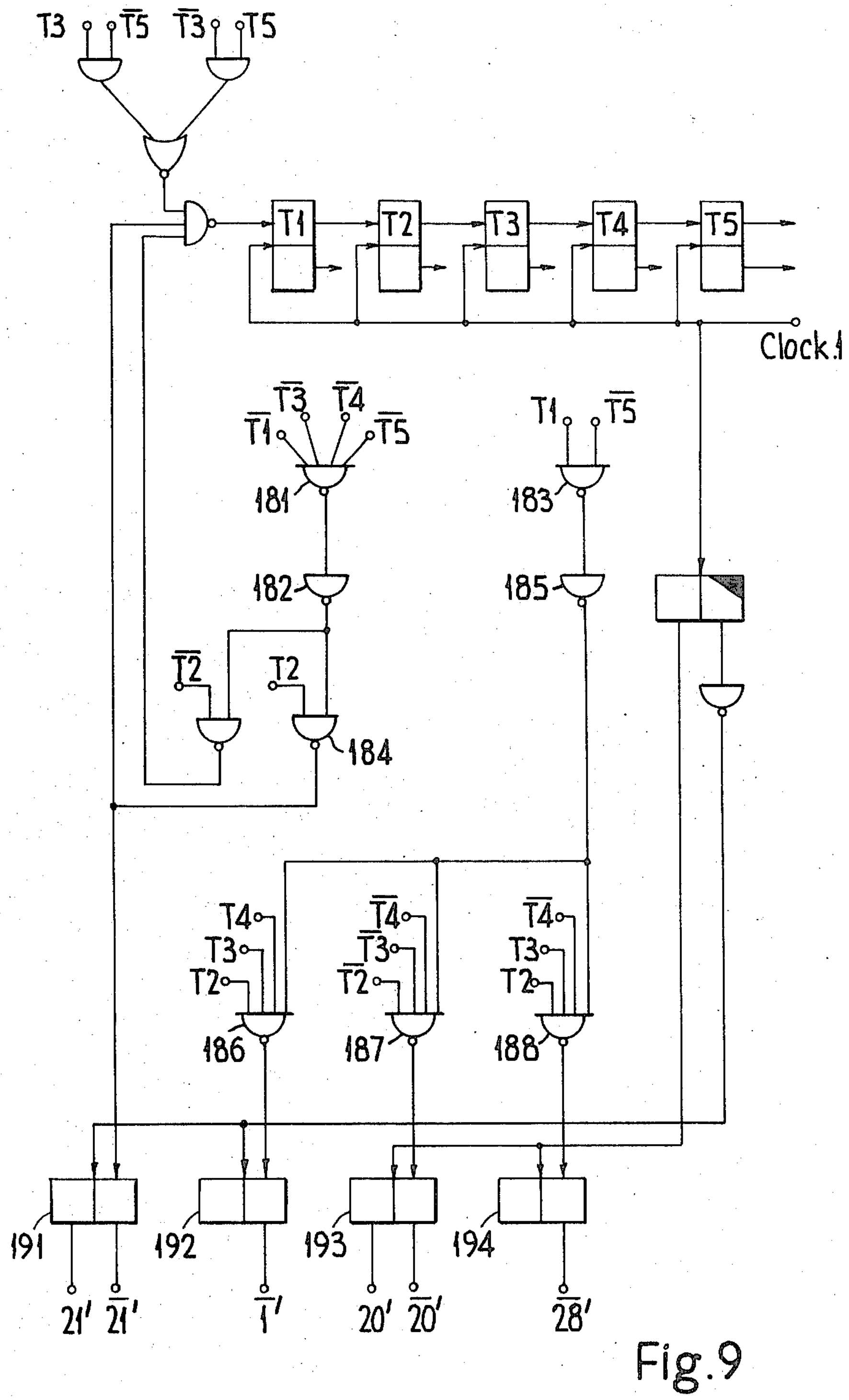
FIGS. 9 to 12 show parts of the transmitting circuitry. For the second terminal.

Referring now to FIGS. 6, 7 and 8, FIG. 6 shows a data shift-register 134 connected for serial read-in of data from a terminal 81C and for parallel read-out to a transfer register 135. Parallel read-out of data from the transfer register is effected in two stages, first by 16 gates 136 and secondly by twelve gates 137. This is because of the reduction from 28 parallel paths in the registers to 18 in the data highways.

The data is in fact stepped in to the data shift register 134 inverted by a gate 148. As mentioned previously, the two integrated circuit registers 134 and 135 are clocked on the falling edges of clock pulses. Register 134 is stepped by the falling edge of an inverted clock 2 pulse and thus at time 2. Register 135 is triggered, to read the contents of register 134, by a signal 154' from a 'data-ready' bistable circuit 141 in FIG. 8.

The two sets of gates 136 and 137 are enabled — to pass the content of the transfer register to the processor — by '0' pulses applied by the processor to terminal 138 ('read first word') and then terminal 139A ('read second word').

FIG. 8 shows the operational data register 140 previously mentioned, and also the 'data-ready' bistable circuit 141, which may be considered part of the data register. The data register 140/141 is required to store indications of the operational state of the receiver for presentation to the processor. The stages D1–D5 (the latter of the bistable circuit 141) store indications of, respectively, failure of the audio carrier signal supplied to the modem 47 (FIG. 1); an 'overflow' condition in which data is waiting in the transfer register to be read out to the processor when thenext signal unit waiting in the data shift register would normally be read into the transfer register (in such cases the data shift register signal unit is likely to be lost); an in-sync condition when confirmed as previously described with reference to FIG. 2; a 'check fail' condition, as described with reference to FIGS. 4 and 5; and finally a 'data ready' condition indicating to the processor that data is waiting in the transfer register for a read instruction.

The five stages of the register 140/141 are read out by way of scanning gates 142–146 which have a common input from a terminal 147 by way of an inverting gate. The processor periodically applies a '0' scanning signal to the terminal 147 thus enabling the gates 142–146 and passing the information stored by the operational date register 140/141 to the processor.

Overflow of data is determined as follows. The 'data ready' bistable circuit 141 has a self-steering input derived from a transition to state 1. There are in fact two inversions of the state 1 signal through gates 150 and 151. Gate 150 is a NAND gate having an input from the 'scan data' terminal 147 as well as the state 1 signal.

This 'scan data' input inhibits any change in the operational data register during its scanning '0' state. The normal Q output of the 'data ready' bistable circuit 141 is applied to gate 146 for scanning by the processor and is also employed, after inversion by gate 152, as a triggering input for both the operational data register 140 and the transfer register 135. Therefore, if the bistable circuit 141 is triggered to its normal Q state by the state 1 signal the current operational state is stored in the register 140 and a new signal unit is read into the transfer register 135 ready for presentation to the processor. There is thus 'data ready' for the processor.

Before the next state 1 signal attempts to read a new signal unit into the data register the processor will normally provide two read instructions for the first and second words. The '0' (pulse) signal applied to terminal 139A as a 'read second word' instruction is also applied to terminal 139B thus providing a 'clear' input to the bistable circuit 141 which reverts to its $\bar{Q}$ state. It is thus prepared for the change to the Q state at the next state 1 signal. If no 'read second word' instruction is received at terminals 139A and B, the next state 1 signal will confirm it in the Q state. The registers 135 and 140 will therefore not be clocked and no change of data occurs in them.

This is then an overflow condition, of which an indication is required in the operational data register 140. This indication is produced by circuitry 154.

A bistable circuit 155 has a trigger input from the state 1 signal and a steering input to the Q side derived from a NAND gate 156. This gate has two inputs, one from the $\bar{Q}$ side of bistable circuit 141 and one from terminal 139A. A '0' on the latter, resulting from a 'read second word' instruction, initially inhibits the second input but puts a '1' from the $\bar{Q}$ side onto the first input. When the '0' clear signal reverts to its normal '1' state the gate 156 is then enabled, producing a stable '0' output. When the next stage 1 signal occurs the bistable 155 is therefore reaffirmed in its $Q=0$ state.

The output of bistable circuit 155 is applied as a trigger input to a further bistable circuit 157 so that a change in the bistable circuit 155 from $Q=0$ to $Q=1$ triggers the bistable circuit 157 into (if not already in) the $Q=1$ state (the steering input being left floating and equivalent to '1'). In the normal, non-overflow, situation the bistable 157 is in its $Q=0$ state and consequently there is a "0" steering input and a '0' output from the D2 stage of the operational data register 140, indicating no overflow. The output is applied to gate 143 for scanning and also to NAND gate 158 which is thus normally disabled. A second input to this gate is derived from the Q =0 output of the bistable circuit 157.

It will be clear that normally, when the gate 156 is enabled, prior to the occurrence of the state 1 signal, there is no change in the circuitry 154. However if a state 1 signal should occur without a previous 'read-second-word' instruction the gate 156 will remain disabled until that state 1 signal, producing a '1' output to steer the bistable circuit 155 to the Q =1 state at the state 1 signal. This transition will trigger the bistable circuit 157 to the Q state, providing a '1' steering input to stage D2 of the operational data register. The next triggering pulse to this register will occur at the next stage 1 signal so recording the overflow condition. The stored condition is fed back to enable gate 158 and clear both bistable circuits 155 and 157 to their original states.

Assuming only a single signal unit overflow the operational data register stage D2 will be reset at the next state 1 signal.

Referring now to FIG. 7, the synchronisation detection circuitry comprises decoding gates 164, 165 and 166. NAND gate 164 receives inputs from the data shift register stages 28, 27, $\bar{26}$, $\bar{25}$, $\bar{24}$, 23, 22 and $\bar{20}$ and NAND gate 165 from stages 21, 19, 18, 17, $\bar{16}$, 15, 14 and 13. Thus both gates will be enabled, producing '0' outputs, when the first 16 digits of a signal unit are 1100 0111 0111 0111 (as appearing in the shift register). This pattern is then, the sync pattern.

The outputs of the two gates 164 and 165 are "anded" by means of NOR gate 166 so that a '1' output from this gate indicates a sync pattern. A transition to this '1' output is used to trigger a bistable circuit 168 the Q side of which is steered by the output of a NOR gate 167. This gate has state 0 and state 16 input signal so that in either of these states a '0' steering signal is applied to the bistable circuit 168. This bistable circuit also has a 'preset' overriding input from a gate 170 which inverts the state 2 signal 2'.

In normal operation the $\bar{Q}$ side of the bistable circuit 168 is preset to '0' at each state 2. At the following state 16 a '0' steering signal is applied to the Q side and at state 16 time 2 the sync pattern is recognised and the bistable circuit is set with a '1' in the $\bar{Q}$ side. This is applied to stage D3 of the register 140 so that on the following state 1 signal the in-sync indication is stored in the register.

If the sync pattern should appear but not in coincidence with state 16 (or state 0) the bistable circuit 168 will not be set to give a '1' output and no indication of a sync signal unit will be stored.

State 0 will also steer the bistable to the sync-unit indication by way of fate 167 if the sync pattern should be detected while the timing generator is in state 0. However, such an indication is only accepted if the bit-check for that signal unit is successful — as previously explained with reference to FIG. 2. In the state 0 of the timing generator an in-sync indication is given by gate 169 which receives the state 0 signal together with the sync pattern signal from gate 166. The output of gate 169 is applied as a 'clear' input to bistable circuit 61 in FIG. 2 to release the timing generator from maintaining the all-zero state 0. The next clock pulse to the timing generator will set it to state 17 in coincidence with the entry of the seventeenth digit of the signal unit into the data shift register, this being the in-sync condition.

Considering now FIGS. 9, 10, 11 and 12, the transmitter circuitry will be described.

A timing generator 180 (FIG. 9) similar to that in FIG. 2 is again employed. It has, as in the receiver, a 28 state cycle operating at the bit rate derived from the modem, but in this case the states are nominated differently in order to simplify the decoding. Thus the number of each state of the timing generator is three greater than for the same state in the receiver. State 20 rather than state 17 is now represented by 10,000 for example.

The decoding of the required state signals $\bar{1}$, 20', $\bar{20}'$, 21 , $\bar{21}'$ and $\bar{28}$ is performed as in the receiver, by gates 181–188. Four bistable circuits 191, 192, 193 and 194 store the decoded signals and are triggered by delayed versions of the clock 1 pulse signal as in the receiver.

Figure 10:
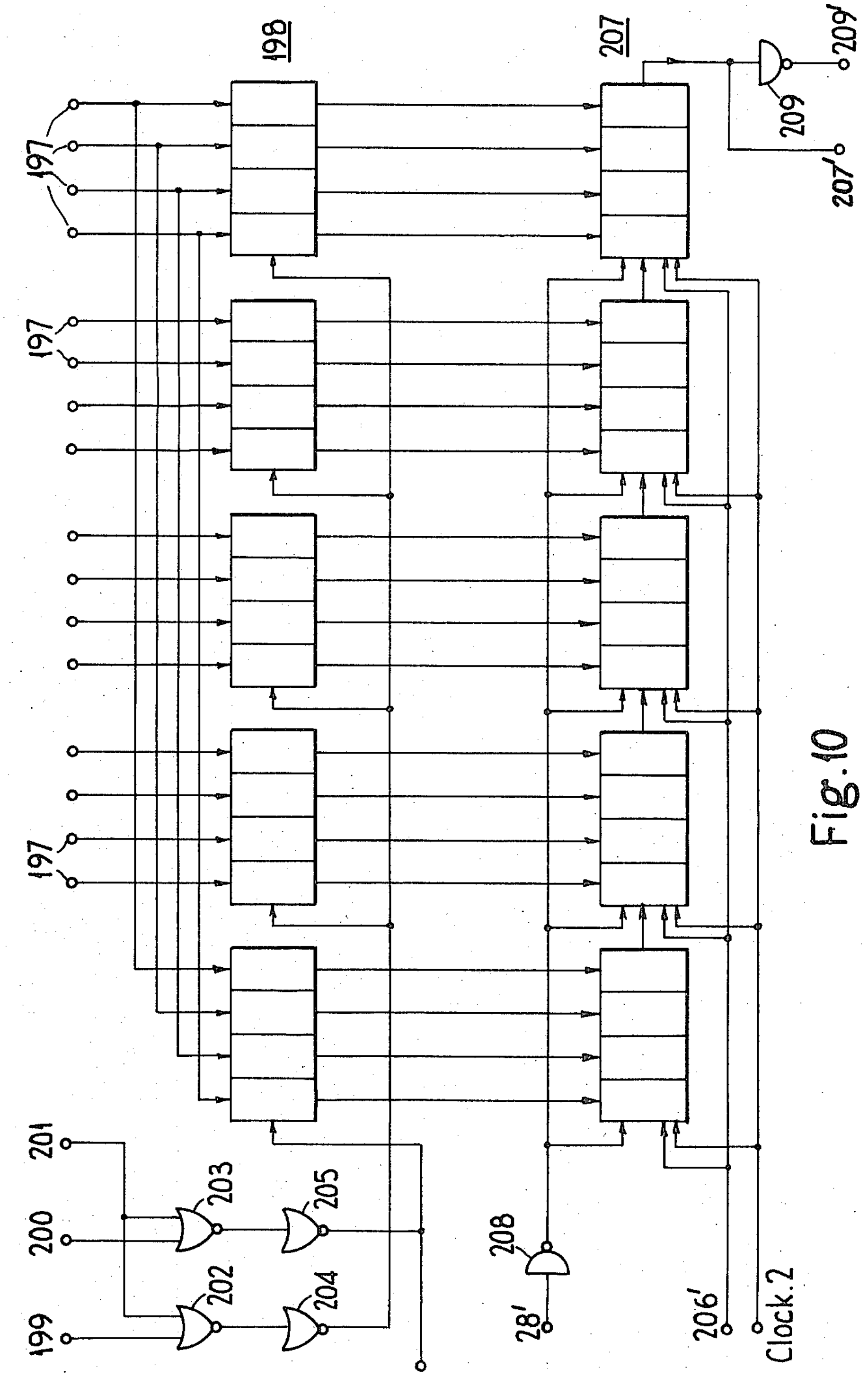

In FIG. 10, data is presented to the transmitter at sixteen terminals 197, corresponding to the 16 (data) pathhighways of the processor. A twenty digit data word from the processor is supplied to a twenty stage transfer register 198 in two stages. First a sixteen digit word is supplied to the right hand four blocks of the register and then the remaining four digit word is supplied from the right hand four terminals 197 to the left hand block of the register 198. The 16 and 4 bit words are clocked in on instructions supplied to terminals 199 and 200 respectively in conjunction with a delayed clock signal applied to terminal 201. The instructions are gated with the clock signal in NOR gates 202 and 203 and the outputs inverted by gates 204 and 205. These outputs provide negative going trigger signals for the register 198 to accept the presented data. An output is also provided from gate 205 following a 'write (four digit) second word' instruction to a 'clear' input of a bistable circuit 206 in 'underflow' circuitry of FIG. 12. As will be explained, this bistable circuit 206 forms one stage of an operational data register.

The various stage outputs of register 198 are connected in parallel to the corresponding stages of a 20 stage parallel/serial register 207. A parallel read-in mode for this register is effected by a state $\overline{28}$ signal and a gate 208. The actual read-in from the transfer register 198 is effected by a trigger signal derived from a '0' to '1' transition in the bistable circuit 206 of FIG. 12. As will be explained, such a transition will only occur if the second (four digit) word has been read into the register 198.

After state 28, the register 207 converts to a serial mode and is clocked at time 2. Two serial outputs are taken from the register 207, inverse data direct, and true data by way of gate 209. The true data, after re-synchronisation to clock 1, is supplied to an output terminal 213 (FIG. 11) for transmission to the modem interface circuitry in accordance with FIG. 1. Both true and inverted data are supplied to the check bit generator shown in FIG. 11 for derivation of the check bits.

Figure 11:
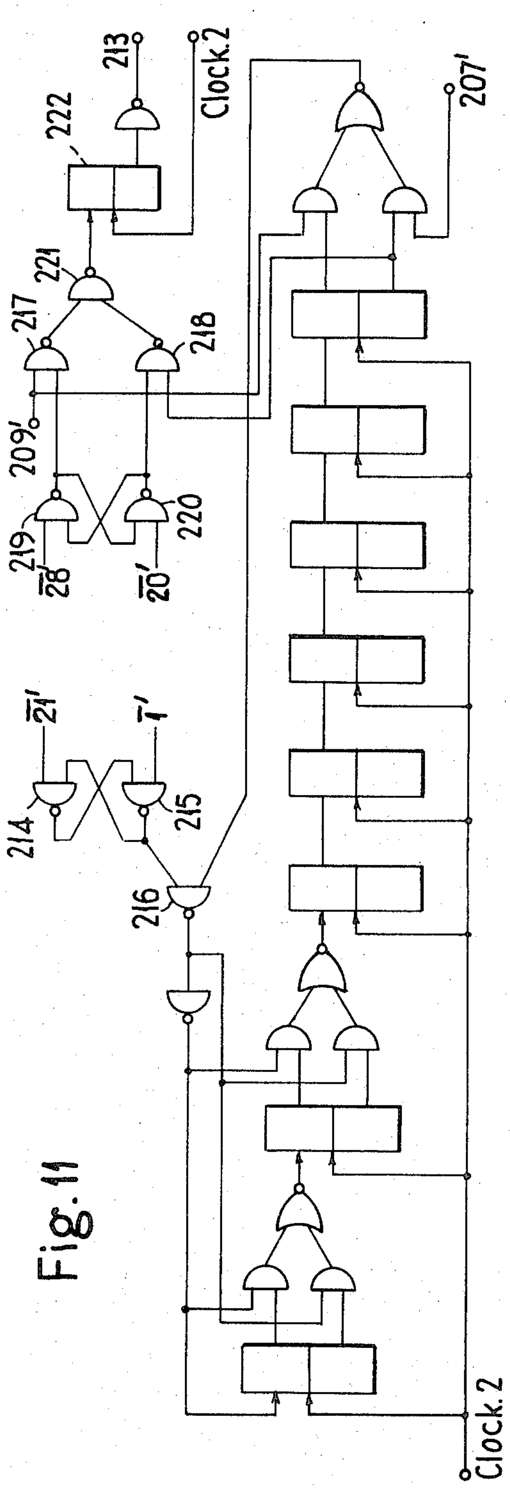
Figure 12:
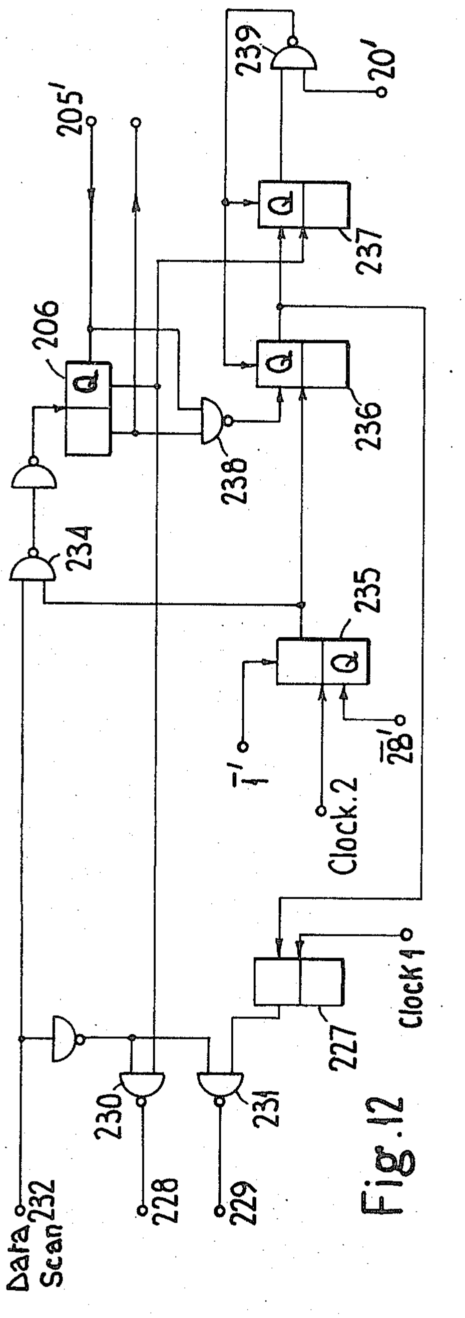

Referring to FIG. 11, the check bit generator comprises eight stages essentially similar to the check pattern detector of FIG. 4. A toggle circuit, comprising NAND gates 214 and 215, controls the operation of the check bit generator. A gate 216 is enabled by the output of toggle gate 215 to close, i.e. make effective, the feedback path of the generator. The toggle is switched by the state signals $\overline{1}$ (to close the feedback loop) and $\overline{21}$ (to open the feedback loop). The generator is thus effective during states 1–20 and acts simply as a shift register during states 21–28 to shift out the check bits that have been determined by the preceding 20 data bits.

The true data from gate 209 in FIG. 10 is supplied as one input of a gate 217 and the inverted check bits, derived from the last stage of the check bit generator, are supplied as one input of a gate 218. A further toggle circuit comprising gates 219 and 220 is switched by state $\overline{28}$ and $\overline{20}$ signals respectively to provide enabling inputs to one or other of the gates 217 and 218. Each gate 217 and 218 provides a permanent '1' output when it is disabled so that a further gate 221 has an output comprising the 20 true data digits followed by the eight inverted check bits. This signal is applied to a bistable circuit 222 for re-synchronisation to clock 1. The re-timed serial data and check bit signal is thus supplied to the output terminal 213.

There would be, in the transmitter, the possibility that the contents of the transfer register 198 will be clocked into the data shift register 207 in successive cycles without any intervening change (or with only a first word change) in the contents of the transfer register. This possibility, namely, underflow, would result in the same signal unit being transmitted repeatedly. It is prevented by the circuitry of FIG. 12.

A transmitter operational data register comprises a stage 227 together with the stage 206 previously mentioned. Stage 206 stores an indication that the register 198 is ready to receive more data, and stage 227 stores an indication of the above 'underflow' condition. These indications are monitored by the processor at terminals 228 and 229 when NAND gates 230 and 231 are enabled by a 'data scan' signal from the processor at terminal 232. The stage 206 is inhibited from changing during a data scan by the application of its trigger signal through a NAND gate 234 which is disabled by the 'data scan'signal.

A trigger signal for the stage 206 is derived from switching of a bistable circuit 235 which is set to $Q =$ 0 by a lock 2 signal at state 28 and is 'preset', to $Q =$ 1, by he state-one signal. Thus thestage 206 will normally be set (to $Q$ =1), to indicate 'send more data,' at every state 28 time 2, and be cleared by a signal from gate 205 on the receipt of a new data word. The new data word is clocked into the shift register 207 as the stage 206 is set to its 'send more data' state by the state 28 clock 2 signal.

In the case where no 'write second word' instruction is received from the processor, and consequently no clear signal is applied to stage 206, a bistable circuit 236 is left with a '1' steering signal to its $Q$ side at the following state 28. This bistable circuit is thus triggered to $Q = 1$ and applies an output '1' to the stage 227 of the data register to indicate the underflow condition to the processor.

Further state 28 clock 2 signals will have no effect on either bistables 206 or 236 until the situation is corrected and a write-second-word instruction appears. This will clear bistable 206 to $Q$ =0 and leave a '0' steering signal to bistable 236. At the next state 28 clock 2 signal, bistable 206 will switch to a send-more-data condition ($Q = 1$) and bistable 236 will be triggered to $Q = 0$ so removing the 'underflow' indication. The switching of bistable 206 enters the previous $Q =$ 1 state of bistable 236 in bistable 237 so that at the next state 20, gate 239 is enabled and both bistables 236 and 237 are cleared to their normal $Q = 0$ condition.

When a data word has been clocked out serially from, the register 107 and the same word in the transfer register 198 is now allowed to replace it, that is, in the underflow condition, the register 207 is set at all zero's, which are clocked out in the same manner as an ordinary data word for the production of appropriate check bits and transmission of the modem.

The two stages of the transmitter operational data register, 206 and 227 are scanned by the processor at the same time as the corresponding register of the receiver.

Having now described the first form of data terminal, the receiver and transmitter of the second form will be dealt with.

In the second arrangement the check bits of the signal units are used both for checking the correct transmission of the units and also for re-synchronising the receiver to the received signal. The 16-bit sync pattern is, however, still used to provide a recognisable standard fill-in signal unit for transmission in any otherwise vacant time slot.

Figure 13:
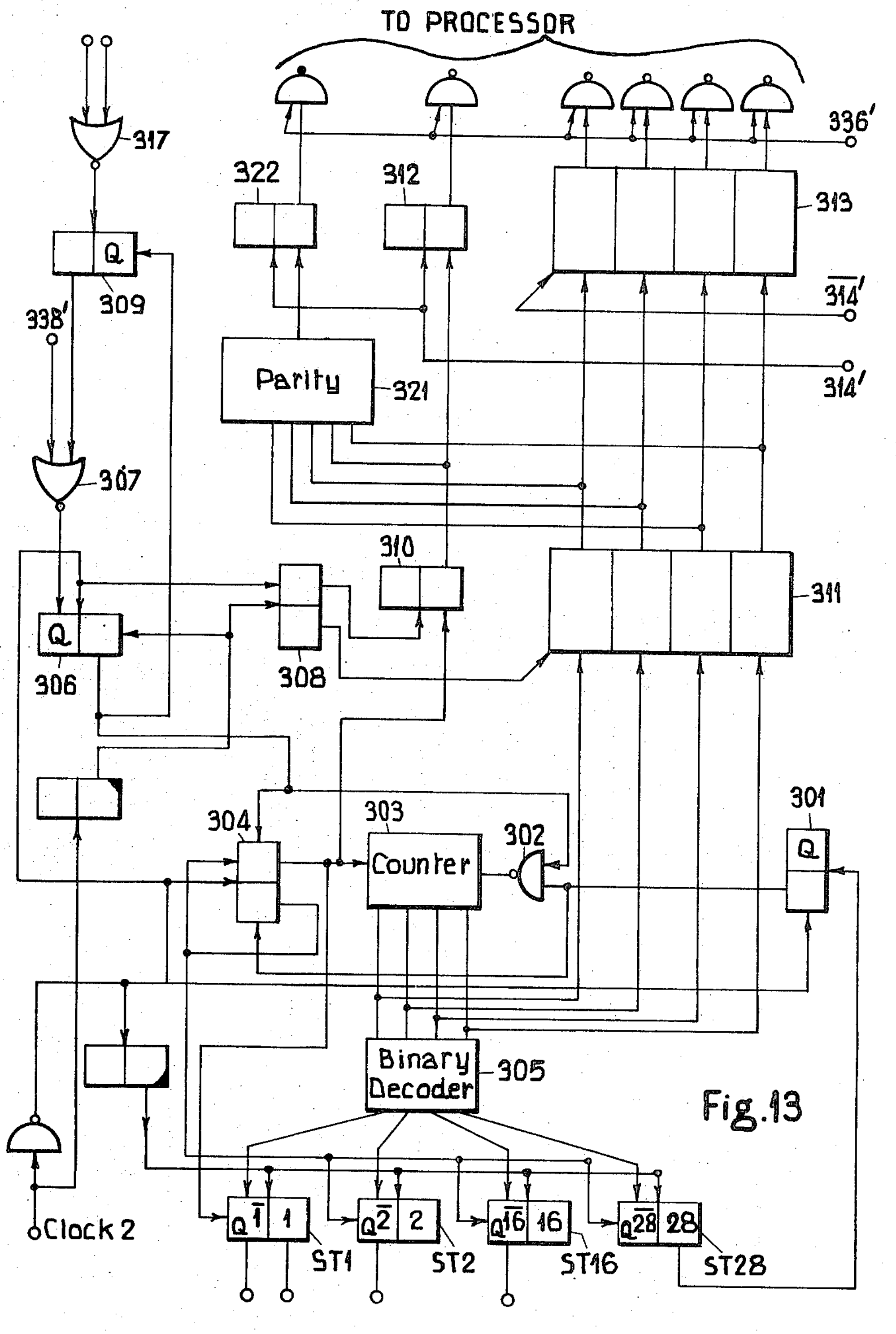
FIGS. 13–16 show parts of the receiver.

Referring to FIG. 13, this shows a timing generator (microprogram) based on integrated circuits. A five stage counter is made up of a 'D-type' bistable circuit 304 and a four-stage binary counter 303. In this modification, signals indicative of states 1, 2, 16 and 28 of a 28 state cycle are required. These are derived from bistable circuits ST1, ST2, ST16 and ST28. The outputs of the counter 303 are applied to the inputs of a binary decorder 305 providing a '0' output to the steering input of the bistable circuits ST1, ST2, ST16 and ST28 when the contents of the counter 303 are 0000, 1000, 0001 and 0111 respectively (reading from the least significant to the most significant digit). The bistable circuits ST1 – ST28 also have preset inputs applied to them derived from the least significant, fifth stage 304 of the five-stage counter, so as to cause the bistables ST1–ST28 to be triggered respectively at stages 1, 2, 16 and 28 of the cycle of the five-stage counter, as required.

The bistable circuit 304 is switched between its states by a clock 1 signal, while the bistable circuits ST are clocked by a delayed version of clock 1. The steering signals for the bistable circuits ST are thus set up before clocking.

As the bistable 304 and counter 303 basically give a thirty-two state count, the state-28 signal is used to reset it and maintain a 28 state cycle. The five stages are reset to 0 0 0 0 0 on the clocking of the ST28 bistable and progress through 0 0 0 0 1 at state 1 to 1 1 0 1 1 at state 27. The resetting is performed through a bistable circuit 301 and a NAND-gate 302 providing alternative resetting inputs, one to state 28 and one to out-of-sync circuitry shown in the upper part of FIG. 13. The bistable circuit 301 is cleared, to give a '1' output, in between all clock 1 pulses.

Figure 14:
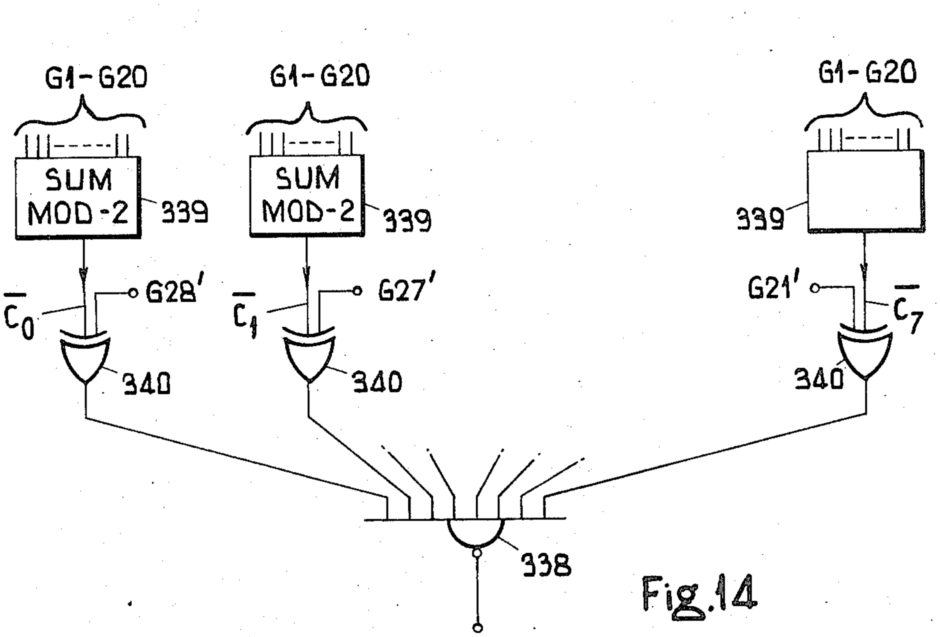

Before describing the out-of-sync circuitry of FIG. 13, the check bit generating and comparison circuitry will be explained with reference to FIG. 14. Eight modulo-2 adding circuits 339 each have a number of inputs connected to various ones of the first 20 stages of the data shift register, that is, those stages which should contain bits 1 –20 of a signal unit at the end of state 28. The stages selected for input to each adding circuit are selected according to a system specified by telephone authorities and which is embodied in the feedback connections of the check register of FIG. 4. Thus each adding circuit 339 has a different combination of about ten inputs appropriately selected from the twenty stages G1–G20 of a data shift register not shown but identified by reference 316 and corresponding to the data shift register 134 of FIG. 6. Each adding circuit produces a single output check bit, a '1' of a '0' according to the modulo-2 sum of the inputs.

As the signal unit bits are clocked through the data shift register, the generated check bits will, of course, change in an apparently random manner.

Now the check bits which form the last eight bits of each signal unit received, are generated at the remote transmitter in accordance with the same specified system that determines the locally generated check bits. Therefore, when the 28 bits of of the current signal unit are correctly located in the 28 stages of the data shift register, the locally generated check bits should correspond exactly to the received check bits in stages G21–G28 of the data shift register The local check bit generation is such as to produce the inverse of the received check bits. Each received check bit is then compared in a non-equivalence gate 340 with its corresponding local check bit, e.g. that in stage G21 with $\bar{C}_7$, stage G22 with $\bar{C}_6$ etc. (The check bit numbering is opposite to that of the twenty data bits. Bit 1 is the first data bit to arrive, check bit $C_7$ is the first check bit to arrive.)

The outputs of all of the gates 340 will then be '1' for the duration of the state in which the received signal unit is wholly in the data shift register. As the data shift register 316 is clocked by the falling edge of clock 2, the 'check OK' state will normally coincide with state 28. If, of course, there have been any errors in the transmission of the signal unit, then if these errors are in the first 20 bits, the wrong check bits will be generated locally and if in the last eight bits then the received check bits will not match the correctly locally generated check bits. In either case one or more of the gates 340 will produce a '0' output which will disable the NAND gate 338.

Gate 338 therefore produces $a^-$'0' when the correct check bit correspondence occurs and a '1' at all other-times.

It may be noted that as the local generation of check bits is a continuous process, and the scanning of the last eight register stages is also continuous, a '0' output of gate 338 will be produced when a correct signal unit occupies the data shift register, no matter which of the 28 states is currently indicated by the microprogram of FIG. 13. This feature is the basis of the resynchronisation of the receiver if it should lose sync with the received signal.

This process will now be described referring to FIG. 13.

The out-of-sync circuitry in the upper part of FIG. 13, comprises a gate 317 which receives an out-of-sync pulse from the processor together with the processor clock signal. An out-of-sync condition is recognised by the processor by a sufficient succession of received 'check fail' indications.

When such an out-of-sync pulse is applied to gate 317, the condition is staticised by bistable circuit 309, to give a steady '0' output. This signal is applied as one input a NOR aNOR gate 307. If the out-of-sync indication from the processor results from a slip in the synchronisation rather than substantial transmission errors, then for one state out of the 28 a '0' will appear on the other input to gate 307 from the check bit comparison gate 338. (This '0' will, of course, appear during state 28 when there is no loss of sync in normal operation.)

The '1' output of gate 307 steers two bistable circuits 306 and 308. However the former is clocked by clock 1 and the latter by delayed clock 2. Bistable 308 is therefore clocked first to produce, in turn, clock inputs (rising and falling respectively) to sections of a 5 bit store 310 and 311 which thus records the current state of the counter 304/303. If the receiver were in sync the current state would be state 28 and therefore the recorded state of the counter 304/303 is a direct count of the number of states out of sync.

The out-of-sync count stored by the register 310/311 is transferred to registers 312 and 313 by clocking signals derived from a bistable circuit 314 (FIG. 16) to be described.

A partiy bit is generated for the out-of-sync count by a parity circuit 321 and stored in a register 322. The registers 312 313, and 322 form an operational data register 319 (FIG. 15) the information in which is scanned periodically by the processor by way of a scan signal applied to terminal 336' (and derived in FIG. 16).

Reverting to the output of gate 307, and immediately following the recording of the out-of-sync count, bistable circuit 306 is clocked by clock 1 to produce a '0' output. The primary effect of this '0' output is to reset the counter 304/303 to 10000 (reading from the least to the most significant bit) which is state 1, the counter running on normally from there. In addition the '0' output of bistable circuit 306 provides a 'clear' signal to bistable circuit 309 so producing the normal '1' output. The '1' steering signal to bistable circuit 306 is therefore removed immediately upon reset of the counter 304/303 but in fact bistable circuit 306 is cleared, to a normal '1' output, by the delayed clock 2 signal.

Figure 15:
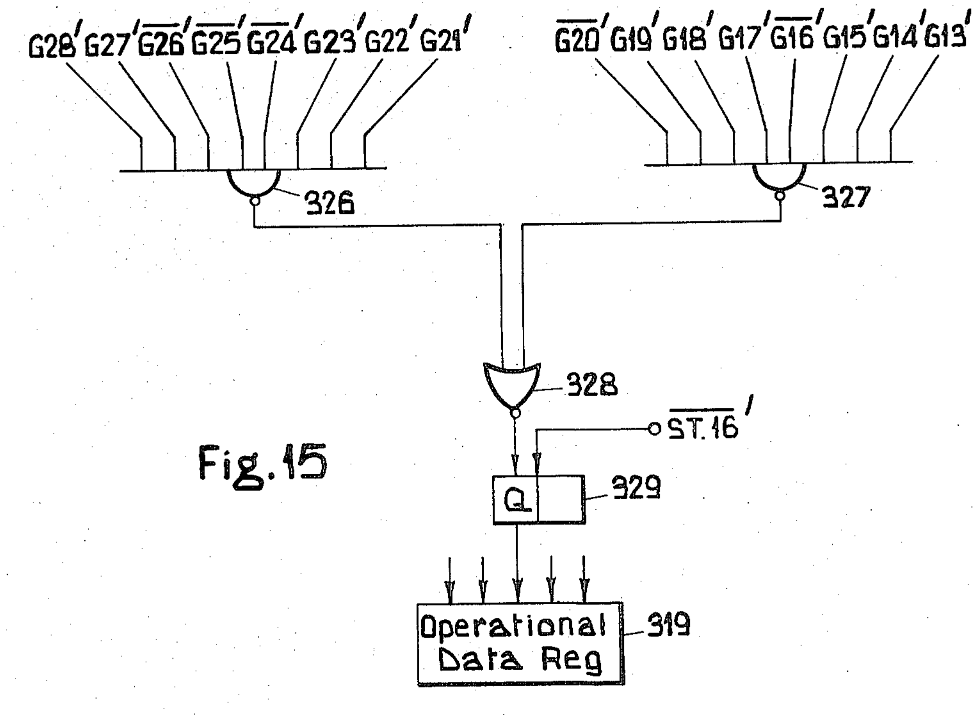

Referring now to FIG. 15, this shows the sync unit monitoring circuit.

The twenty eight stages of the data shift register are designated G1–G28 in conformity with the bit numbers of asignal unit in the register (i.e. during state 28). The incoming data therefore enters stage G28 first and is clocked through to stage G1. In a sync unit the sync pattern comprises the digits, 1100 0111 0111 0111 in the first 16 bit positions. A sync pattern is detected immediately upon its presence in the data shift register and thus when stages G28–G13 contain the above digits respectively.

The normal or inverse outputs from these stages are applied to two NAND-gates 326 and 327 as shown, so that when stages G28–G13 are occupied by the above pattern the two gates are enabled. N NOR-gate 328 is then enabled to steer a bistable circuit 329. The chance of a sync pattern occurring at random in the bit train is accommodated by clocking the bistable 329 only at the end of state 16 at which time a genuine one would be present. The resulting '1' output of bistable circuit 329 is applied to the operational data register 319 for entry at the next state 1.

Figure 16:
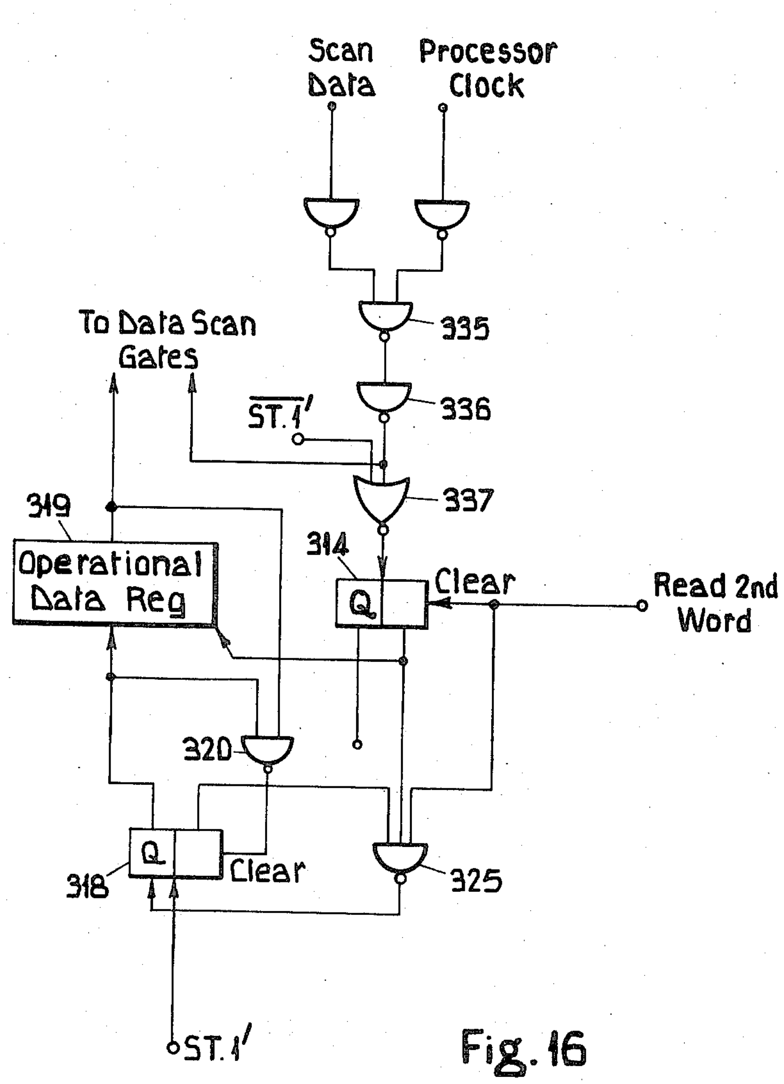

The present modification employs an overflow circut as shown in FIG. 16.

An overflow condition occurs as follows. A transfer register now shown but corresponding to transfer register 135 of FIG. 6 and identified by reference 315, is clocked to write in the contents of the data shift register 316 when a bistable circuit 314 is triggered to a $Q = 1$ state. The contents of the transfer register are read out to the processor in two stages, a first word comprising bits from stages G1–G16 and two parity bits, and a second word comprising bits from stages G17–G20 with one parity bit, and check bits from stages G21–G28 with one parity bit. Each word is read out on the occurrence of an instruction 'read first (or second word.' It is required that once a signal unit has been clocked into the transfer register no subsequent signal unit shall over-write it. No further write-in must therefore occur until after the instruction 'read second word' and any 'overflowing' signal unit in the data shift register must therefore be lost.

Each time that the bistable circuit 314 is triggered to transfer the contents of the data shift register 316 to the transfer register 315, it must be reset before it can repeat the operation and this is normally achieved by the 'read-second-word' instruction which clears the bistable circuit 314.

Clearly if no 'read-second-word' instruction appears then the transfer register cannot be clocked and its contents are preserved.

The bistable circuit 314 is triggered by a signal from the inverse side of the state 1 bistable of FIG. 13. This signal is applied to a NOR-gate 337 together with a data scanning signal from the processor by way of gates 335 and 336, the inversion of gate 337 causing triggering of bistable 314 at the beginning of state 1. As the operational data register 319 is also clocked by the triggering of bistable circuit 314 it is necessary to inhibit this triggering during a data scan. A data scan signal will result in a '1' input to gate 337 which holds the trigger input to bistable circuit 314 at '0.'

An indication of the overflow condition is recorded in the operational data register 319 as follows. If no '0' clear signal is applied to bistable circuit 314 as a result of a missing 'read-second-word' instruction then the bistable 314 is still in its $\bar{Q} = 0$ state when the next state 1 signal arrives. This $\bar{Q} = 0$ state is applied to a NAND-gate 325 to produce a "1" output as a steering signal to a bistable circuit 318 which is triggered by the leading edge of a state 1 signal. This bistable circuit 318 is therefore triggered to its $Q = 1$ state to provide a '1' overflow signal to the operational data register 319 and also a priming '1' to a NAND-gate 320 in preparation for resetting the bistable circuit 318 to its normal condition.

The state 1 pulse that set the bistable circuit 318 to its overflow (Q) state merely confirmed the bistable circuit in its $\bar{Q} = 0$ state.

When a read-second-word instruction finally appears, to clear bistable circuit 314 to $Q = 0$, the next state 1 pulse will reset it to $Q = 1$ so clocking the operational data register 319 and recording the overflow state of bistable circuit 318. When the overflow condition is thus stored in the regiser 319 the gate 320 has two '1' inputs and its output clears the bistable 318 to its normal $Q = 0$ state. An output from the $\bar{Q}$ side of bistable 318 is applied to the gate 325 to hold the '1' steering input to bistable 318 until the overflow condition is recorded in the operational data register 319.

THe circuit is then back in its normal condition with an overflow indication in the operational data register ready for scanning by the processor.

A third output to the gate 325 directly from the 'read-second-word' instruction ensures that if the instruction is delayed to such an extent as to coincide with the next state 1 signal so that the normal overflow signal ('0') is not provided by bistable circuit 314, then a direct '0' signal is applied to gate 325.

In the modified receiver a complete parity check is maintained on all information transmitted to the processor. As mentioned previously, the first word (16 bits) of a signal unit is sent to the processor with two parity bits, the second word is sent with two parity bits including one for the eight check bits.

On a scan of the operational data, one parity bit is provided for the out-of-sync count (as mentioned in connection with FIG. 13) and one to cover operational data generated in the receiver and elsewhere, 'sync unit', 'check fail' 'overflow,' 'data received,' in the receiver, 'underflow,' 'demand for data' 'transmitter parity,' in the transmitter, and 'carrier fail,' in the modem.

The transmitter of the modified arrangement also includes various improvements on the basic arrangement.

A microprogram not shown but similar to that of FIG. 13 is again employed, comprising a four stage counter supplied by a single bistable circuit to give five stages. The 32 states thus provided, are limited to 28 by resetting from state 28 as before. The timing signals to be provided by this microprogram are the inverse signals of states 1, 8, 16, 20, 21 and 28, that is, signals having a level '1' except during the specified state.

The modified transmitter includes, as before, a 20-stage transfer register into which the signal unit bits are read, in parallel, from the processor, and a data shift register (355, FIG. 19) into which the signal unit bits are read in parallel and from which they are clocked serially. Read-in from the processor to the transfer register is achieved in two stages, a 16 bit word (bits 1–16 as designated in the receiver description), and a four bit word (bits 17–20). In addition to the data thus transferred, parity bits are generated in the processor and read into stores in the transmitter, as will be explained with reference to FIG. 19. The first word is clocked into the transfer register on a 'write-first-word' instruction from the processor (at the same time clocking in parity bits $F_0$ for bits 1–8 and $F_1$ for bits 9–16). The four-bit second word is then clocked into the last four stages of the transfer register, a parity bit $P_{12}$ being clocked into a respective store simultaneously.

The 20-bit word is then clocked into a data-shift-register in parallel mode for feeding out serially to a check bit generator. If the data shift register should be clocked to receive the contents of the transfer-register before the read-second-word instruction arises, then part of the signal unit would be lost. Such a condition is referred to as 'underflow' and is prevented by the circuit of FIG. 17.

Figure 17:
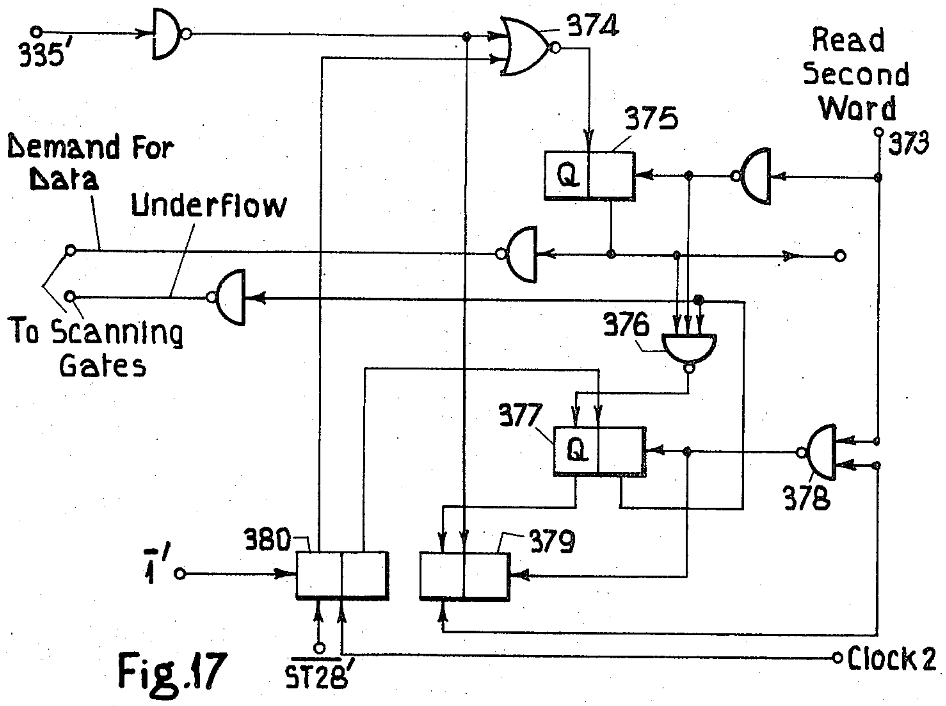
FIGS. 17–19 show parts of the transmitter.

Referring to FIG. 17, parallel clocking of the data-shift-register to read the transfer register is achieved by a bistable circuit 375 on switching to a $Q = 1$ state. The data-shift-register 355 clocks on a falling edge provided by the $\bar{Q}$ side of the bistable circuit 375. In order for this transition to be made, the bistable circuit 375 has first to be cleared (to $Q = 0$) by a 'read-second-word' instruction applied to terminal 373. If, therefore, no such instruction arises, the data shift register cannot be clocked.

The bistable circuit 375 is clocked by a further bistable circuit 380 which is preset to $Q = 1$ at state 1 and triggered to $Q = 0$ at state 28. The latter transition in turn clocks bistable circuit 275 by way of a NOR-gate 374 which enables a data-scan signal at erminal 335' to inhibit the clocking of bistable circuit 375. There can thus be no change of data during the data scanning process.

At state 28 clock 2, bistable circuit 375 will normally switch to $Q = 1$ while bistable circuit 377 will be confirmed in its $Q = 0$ condition so providing no underflow indication to the appropriate scanning gate. Bistable circuit 375 then provides a '1' indication at the appropriate scanning gate indicating a demand for data. If then the first word is read as required but no 'read-second-word' instruction arises, the next state 28 will cause bistable 377 to be triggered to its $Q = 1$ state due to the $\bar{Q} = 1$ state due to the $\bar{Q} = 1$ output of bistable 375 which will merely be confirmed in that condition.

When bistable 377 switches to $\bar{Q} = 0$ it holds a '1' steering input to its $Q$ side by way of NAND-gate 376. It also provides a '1' input to the appropriate scanning gate to indicate an underflow condition to the processor. A periodic data scanning signal arising at 335' will trigger the bistable circuit 379 into a $Q = 1$ condition to indicate that the underflow condition has been recognised by the processor. The $Q = 1$ output of bistable circuit 379 is then used to clear bistable 377 of its underflow condition by way of NAND-gate 378 when the next 'read-second-word' instruction arises. Thus the 'underflow' indication remains until the remaining data has been received from the processor.

Figure 18:
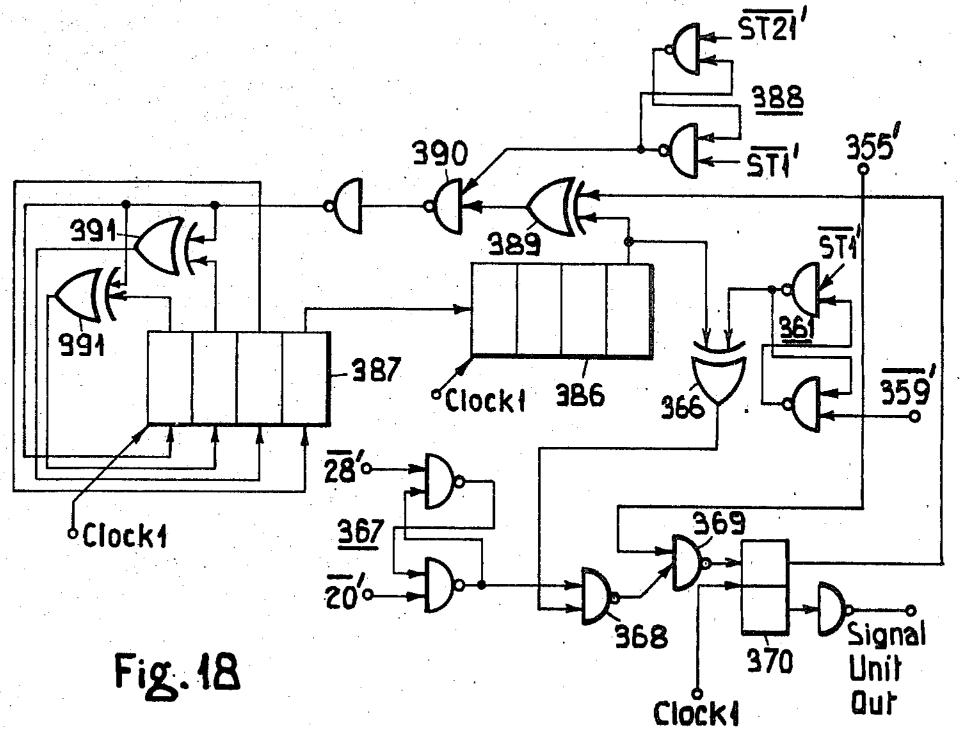

The check-bit generator of the modified transmitter is shown in FIG. 18. This comprises two integrated circuit four-bit shift registers 387 and 386. These are both clocked by the falling edge of a clock 1 signal, register 387 having four parallel inputs clocked by this signal while register 386 is clocked in serial mode having only one input from the final output of register 387. A true data signal is derived from a bistable circuit 370 and is applied to the first input of register 387 after being gated with the final output of the check bit generator in a non-equivalence gate 389. The remaining inputs of register 387 are derived from various combinations of the outputs and of the incoming data in accordance with the scheme for the basic transmitter check bit generator.

A toggle circuit 388 has input signals from the microprogram at states 1 and 21 effective to enable a gate 390 in the data feedback path at state 1 and disable it at state 21. Thus when the twenty bits of a signal unit received from the processor have been clocked into the check bit generator the gate 390 is disabled to prevent further feedback. Eight further bits are then clocked out of the generator and the cycle repeated for the next signal unit.

The output path for the check bits includes a non-equivalence gate 366 and two NAND-gates 368 and 369. A second input to the gate 366 is derived from a toggle circuit 361 having two inputs, an inverse state 1 signal and an 'error' signal derived in a manner to be explained. Following a state 1 signal the output of the toggle circuit 361 is a '1' which allows the gate 366 to invert the outgoing check bits. In the event of an error signal to the toggle circuit 361, a '0' is applied to gate 366 to cause it to pass the check bits without inversion. The check bits are therefore inverted or not in dependence upon the presence of an error signal.

The gate 368 is controlled by a toggle circuit 367 having inputs $\overline{28}'$ and $\overline{20}'$, which enables the gate 368 for the passage of the check bits and then disables it.

The gate 369 has one input from the gate 368 and one from the output of the data-shift-register 355. When the 20 bits of the signal unit have been shifted out of the data-shift-register the continued clocking of this register produces a series of '1's which enable the gate 369 to pass the check bits.

The total inversions in the two paths, data and check bit, are such that both normally appear at the input to the bistable circuit 370 in the correct relationship — data true, check bits inverted. The $Q$ output of the bistable is fed back to the check bit generator while the $\bar{Q}$ output is inverted and supplied as the fanal output to the modem interface.

Clearly, in the presence of the error signal the check bits as transmitted will be totally incorrect in relation to the associated data bits.

Figure 19:
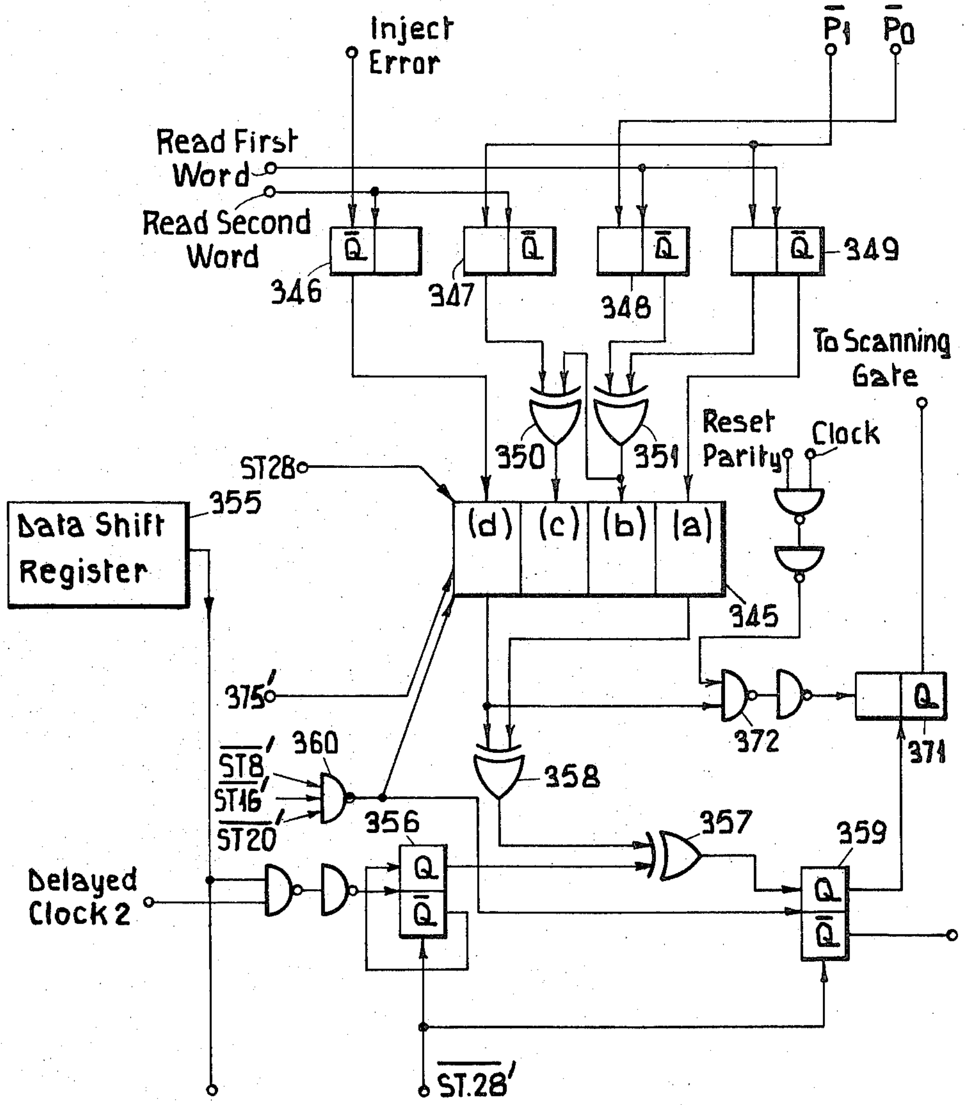

The generation of the error signal referred to above will be described with reference to FIG. 19.

It is desirable in data transmission employing error detection facilities that these should be tested periodically to check that the receiver responds properly. Consequently, in the present terminal, the facility is provided whereby an 'inject error' instruction from the processor is used to apply an error input to toggle 361, so as to invert the check bits from their proper relationship. In addition, the further facility is provided whereby an error input is automatically applied to the toggle 361 in the event of a parity error arising between the processor and the transmitter. It will be appreciated that, without this latter facility, such a parity error would not manifest itself in the transmitted check bits, since these check bits would themselves have been generated in respect of a faulty data.

In the processor, parity bits are determined for the 20-bit word as follows. $P_1$, for bits 1–8, gives nine bits with odd parity, $P_0$, for bits 9–16, again gives nine bits with odd parity, and $P_{12}$, for the remaining four bits, gives five bits with odd parity. $\bar{P}_1$ and $\bar{P}_0$ are clocked into stores 349 and 348 simultaneously with the reading in of the first word to the transfer register, and $\bar{P}_{12}$ is clocked into store 347 when the second word is read in. A further store 346 accepts a '0' error signal from the processor if present when the second word is clocked in.

A parallel serial shift register 345 is clocked to receive parallel inputs from the stores 346, 7, 8 and 9 in state 28 time 2, this clock signal being derived from the bistable 375 in FIG. 17. The stages referenced (a), (b) and (c) are required to store cumulative parity bits corresponding to the bits $P_1$, $P_0$ and $P_{12}$. Stage (a) therefore receives the $\bar{Q}$ output of store 349 to give $P_1$ directly. Stage (b) requires to be a '1' if both the first eight-bit bytes are of even or both of odd parity in order to give seventeen bits of odd parity. $P_O$ is therefore compared with $\bar{P}_1$ in a non equivalence gate 351 the output of which provides an input to the second stage (b). The third stage similarly derives an input from that to the second stage and from the parity bit $P_{12}$ by way of a gate 350.

The cumulative parity bits thus derived in stages (a), (b) and (c) are then compared with the actual parity of the eight bit group 16-bit group and twenty bit word as they are shifted out the data-shift-register 355.

A bistable 356 is switched between its states, by a delayed clock 1, at each '1' in the output of the data-shift-register 355. The bistable 356, together with a further bistable 359, is cleared to give a '0' output at each state 28. Consequently its output will be '0' or '1' after eight, 16 and 20 bits, of the word shifted out of the data-shift-register 355, according as the cumulative parity at those states is even or odd.

The output of the bistable 356 is applied to a non-equivalence gate 357 for comparison with the stored parities. The stored parities, together with any error instruction ('0') in stage (d) of the register 345, are shifted out of the register from left to right by a clock signal derived from a gate 360. The three states 8, 16 and 20 provide inputs to this gate which therefore clocks the register 345 at the trailing edges of the three states. In addition the bistable 359 is clocked by the same signals but at the leading, rising, edges.

Assuming no "inject error" instruction is present, stage (d) of register 345 initially contains a '1' and will continue to do so as the contents are shifted out. Gate 358, having inputs from stages (a) and (d) therefore merely inverts the content of stage (a). If now the first eight bits (in the processor) had even parity, $P_1$ would have been supplied as a '1' and the corresponding input to gate 357 would, until the end of state 8, have been '0.' If no error has occurred in the bits shifted out of the data-shift-register 355 then the first eight bits, of even parity, will leave a '0' output of bistable 356. There is consequently no disagreement, a '0' output of gate 357 to steer bistable 359, at the beginning of stat 8, and a '1' (no error) output from the $\bar{Q}$ side of bistable 359. Assuming there is again no disparity at states 16 and 20, bistable 359 will remain confirmed in its $\bar{Q} = 1$ state so giving no error signal to error input $\overline{359}$ of toggle circuit 361 (FIG. 18).

If, however, a disparity occurs between any of the cumulative stored parities (each in turn in stage (a) of the register 345) and the current parity output of bistable 356, the gate 357 will produce a '1' output to steer bistable 359 to give an output error signal to the toggle circuit 361 (FIG. 18), thus causing the check bits to be incorrectly transmitted, as previously described The occurrence of a parity fault is signalled to the processor by means of a bistable 371 which is clocked into its $Q = 1$ state when the bistable 359 is triggered into its $Q = 1$ state. The bistable 371 can then be scanned by the processor, following which it is reset by a "O" reset signal applied to bistable 371 by way of NAND gate 372.

In the case where an "inject error" instruction has been issued by the processor, stage (d) will contain a "0." Gate 358 will thus no longer invert the parity bit $P_1$, so that this parity bit will be incorrectly applied to the parity checking circuitry (bistables 359 and 356). Thus, bistable 359 will be triggered into its $Q = 1$, and will apply an output error signal to toggle 61 (FIG. 18), resulting in incorrect transmission of the check bits, as before.

It will be seen that this "inject error" instruction therefore permits the parity checking circuitry (bistables 359 and 356) to be tested for correct operation.

In the case where an error has been injected in response to an "inject error" instruction from the processor, it is clearly not necessary for the terminal to signal the occurrence of a parity fault. Thus, it is arranged that bistable 371 is prevented from being clocked into its $Q = 1$ state by the output from stage (d) of register 345, which holds this bistable in its $\bar{Q} = 1$ state.

We claim:

1. A data terminal for a digital signalling system employing multi-digit signal units transmitted in serial form, said terminal having receiver circuitry comprising: a timing generator having a cycle of time slots equal to the number of digits in a signal unit; means responsive to said timing generator for dividing incoming serial data into said signal units for supplying to utilisation means; synchronisation indicating means for deriving an indication of synchronisation from said incoming data, and resynchronisation means responsive to a command signal from said utilisation means to reset said timing generator in synchronism with the incoming data in response to a said indication of synchronisation.

2. A data terminal according to claim 1 wherein said resynchronisation means comprises means for halting said timing generator in response to said command signal, and means for restarting said timing generator at a predetermined point of its cycle upon occurrence of a said indication of synchronisation.

3. A data terminal according to claim 1 wherein said resynchronisation means comprises means for resetting the timing generator, without halting it, to a predetermined point of its cycle on occurrence of the next said indication of synchronisation following a said command signal.

4. A data terminal according to claim 1 wherein said resynchronisation means comprises means for producing an indication, for read out by said utilisation means of the amount by which the timing generator is out of synchronism with the incoming data.

5. A data terminal according to claim 1, for use in a data signalling system wherein each of said multi-digit signal units comprises a message portion and a check portion having a predetermined correlation with the message portion at least on transmission thereof, wherein said receiver circuitry further comprises checking means for checking the correlation between the check portion and the message portion of each signal unit, and means for storing an indication of the absence of such a correlation for read out by said utilisation means.

6. A data terminal according to claim 5 wherein said synchronisation indicating means comprises means for recognising a predetermined pattern of digits occurring in a said signal unit of the incoming data.

7. A data terminal according to claim 5 wherein said synchronisation indicating means comprises means for recognising successive sequences of digits in he incoming data having said predetermined correlation as between a message portion and a check portion.

8. A data terminal according to claim 5 wherein said resynchronisation means comprises means responsive to said checking means, for automatically resetting the timing generator in the event of said checking means indicating the absence of said predetermined correlation during the cycle of the timing generator immediately following a reset.

9. A data terminal according to claim 1 wherein said means for dividing incoming serial data into signal units comprises: a transfer register; a serial-to-parallel converter for receiving said incoming data in serial form and for writing a signal unit into the transfer register, in parallel, at a predetermined point of the cycle of said timing generator; means for reading the contents of said transfer register into said utilisation means in response to a read instruction from said utilisation means; overflow detection means for detecting an overflow condition wherein data is being received by said serial-to-parallel converter faster than it is being read out of said transfer register; and means for inhibiting the writing of a signal unit from said serial-to-parallel converter into said transfer register during occurrence of a said overflow condition.

10. A data terminal according to claim 1 having transmitter circuitry comprising: a transfer register; means for writing data from said utilisation means into said transfer register in response to a write instruction from the utilisation means; a parallel-to-serial converter for reading a signal unit in parallel from the transfer register at a predetermined point in the cycle of a transmitter timing generator and for transmitting said signal unit in parallel form; underflow detection means for detecting an underflow condition wherein data is being transmitted from said parallel-to-serial converter faster than it is being written into said transfer register; and means for inhibiting the reading of a signal unit from said transfer register into said parallel-to-serial converter during occurrence of said underflow condition.

11. A data terminal according to claim 1 having transmitter circuitry including parity checking means for verifying correct transmission of data between said utilisation means and said transmitter circuitry, and means for injecting a predetermined error into a signal unit to be transmitted, in response to a parity fault detected by said parity checking means.

12. A data terminal according to claim 11 further including means responsive to an instruction from said utilisation means to cause an incorrect parity bit to be applied to said parity checking means, thereby resulting in injection of said predetermined error.

* * * * *